(12) United States Patent
Wang et al.

(10) Patent No.: US 7,584,262 B1
(45) Date of Patent: Sep. 1, 2009

(54) METHOD OF AND SYSTEM FOR ALLOCATING RESOURCES TO RESOURCE REQUESTS BASED ON APPLICATION OF PERSISTENCE POLICIES

(75) Inventors: Wei Wang, San Jose, CA (US); Hui Zhang, Cupertino, CA (US); Erik De La Iglesia, Mountain View, CA (US); Ricky K. Lowe, Atherton, CA (US); Kiet Tran, Saratoga, CA (US); Mark Aaron Wallace, San Jose, CA (US)

(73) Assignee: Extreme Networks, Santa Clara, CA (US)

( * ) Notice: Subject to any disclaimer, the term of this patent is extended or adjusted under 35 U.S.C. 154(b) by 460 days.

(21) Appl. No.: 10/075,051

(22) Filed: Feb. 12, 2002

Related U.S. Application Data

(63) Continuation-in-part of application No. 10/098,957, filed on Feb. 11, 2002.

(60) Provisional application No. 60/355,922, filed on Feb. 11, 2002.

(51) Int. Cl.
   *G06F 15/16* (2006.01)
(52) U.S. Cl. ............... 709/217; 709/218; 709/219; 709/226; 709/229
(58) Field of Classification Search ................. 709/217, 709/226, 227, 234, 229, 218, 219
   See application file for complete search history.

(56) References Cited

U.S. PATENT DOCUMENTS 4,766,534 A 8/1988 DeBenedictis
5,315,708 A 5/1994 Eidler et al.

(Continued)

OTHER PUBLICATIONS

Dykstra; *Gigabit Ethernet Jumbo Frames: and why you should care*; http://sd.wareonearth.com/~phil/jumbo.html (Dec. 20, 1999).

(Continued)

*Primary Examiner*—William C Vaughn, Jr.
*Assistant Examiner*—Djenane M Bayard
(74) *Attorney, Agent, or Firm*—Howrey LLP

(57) ABSTRACT

A system for and method of allocating a resource to a service request based on application of a persistence policy is described. In one embodiment, upon or after allocation of a resource to a resource request, an entry representing the allocation is made in a data structure using a first index derived from information relating to the resource request if such is available. An entry representing the allocation is also made in the data structure using a second index derived from information relating to the resource request. When a resource request is received, the data structure is accessed using the first index if such is available. If an entry corresponding to the first index is available, the resource corresponding to the entry is allocated to the request. If the first index or an entry corresponding to the first index is unavailable, the data structure is accessed using the second index. If an entry corresponding to the second index is available, the resource corresponding to the entry is allocated to the request. If an entry corresponding to the second index is unavailable, a resource is allocated to the request based on application of a load balancing policy or other persistence policy. One or more entries are then made in the table corresponding to the new allocation.

17 Claims, 24 Drawing Sheets

U.S. PATENT DOCUMENTS

| | | | |
|---|---|---|---|
| 5,396,490 A | 3/1995 | White et al. | |
| 5,528,761 A | 6/1996 | Ooba et al. | |
| 5,553,242 A | 9/1996 | Russell et al. | |
| 5,561,807 A | 10/1996 | Verplanken et al. | |
| 5,745,694 A | 4/1998 | Egawa et al. | |
| 5,826,082 A | 10/1998 | Bishop et al. | |
| 5,937,169 A | 8/1999 | Connery et al. | |
| 5,974,518 A | 10/1999 | Nogradi | |
| 6,018,516 A | 1/2000 | Packer | 370/231 |
| 6,044,468 A | 3/2000 | Osmond | 713/201 |
| 6,091,733 A | 7/2000 | Takagi et al. | 370/401 |
| 6,195,703 B1* | 2/2001 | Blumenau et al. | 709/238 |
| 6,208,650 B1 | 3/2001 | Hassell et al. | |
| 6,212,190 B1 | 4/2001 | Mulligan | |
| 6,233,615 B1 | 5/2001 | Van Loo | |
| 6,247,060 B1 | 6/2001 | Boucher et al. | 709/238 |
| 6,298,280 B1 | 10/2001 | Bonora et al. | 709/227 |
| 6,304,906 B1 | 10/2001 | Bhatti et al. | |
| 6,327,622 B1* | 12/2001 | Jindal et al. | 709/228 |
| 6,341,129 B1 | 1/2002 | Schroeder et al. | |
| 6,351,812 B1* | 2/2002 | Datar et al. | 713/182 |
| 6,363,421 B2 | 3/2002 | Barker et al. | |
| 6,411,986 B1 | 6/2002 | Susai et al. | |
| 6,453,360 B1 | 9/2002 | Muller et al. | |
| 6,480,489 B1 | 11/2002 | Muller et al. | |
| 6,490,281 B1 | 12/2002 | Abler et al. | |
| 6,526,056 B1 | 2/2003 | Rekhter et al. | |
| 6,532,487 B1 | 3/2003 | Perks | |
| 6,549,516 B1 | 4/2003 | Albert et al. | |
| 6,549,961 B1 | 4/2003 | Kloth | |
| 6,606,315 B1 | 8/2003 | Albert et al. | |
| 6,606,316 B1 | 8/2003 | Albert et al. | |
| 6,625,650 B2 | 9/2003 | Stelliga | |
| 6,628,654 B1 | 9/2003 | Albert et al. | |
| 6,633,560 B1 | 10/2003 | Albert et al. | |
| 6,650,641 B1 | 11/2003 | Albert et al. | |
| 6,687,222 B1 | 2/2004 | Albert et al. | |
| 6,704,278 B1 | 3/2004 | Albert et al. | |
| 6,714,985 B1 | 3/2004 | Malagrino et al. | |
| 6,724,767 B1 | 4/2004 | Chong et al. | |
| 6,725,457 B1 | 4/2004 | Priem et al. | |
| 6,728,748 B1 | 4/2004 | Mangipudi et al. | |
| 6,735,169 B1 | 5/2004 | Albert et al. | |
| 6,742,045 B1 | 5/2004 | Albert et al. | |
| 6,775,692 B1 | 8/2004 | Albert et al. | |
| 6,781,992 B1 | 8/2004 | Rana et al. | |
| 6,788,704 B1 | 9/2004 | Lindsay | |
| 6,836,462 B1 | 12/2004 | Albert et al. | |
| 6,839,811 B2 | 1/2005 | Fujiyama | |
| 6,891,839 B2 | 5/2005 | Albert et al. | |
| 6,937,606 B2 | 8/2005 | Basso et al. | |
| 6,973,097 B1 | 12/2005 | Donzis et al. | |
| 6,981,029 B1* | 12/2005 | Menditto et al. | 709/217 |
| 7,065,086 B2 | 6/2006 | Basso et al. | |
| 7,072,981 B1 | 7/2006 | O'Rourke et al. | |
| 2001/0034792 A1 | 10/2001 | Swildens | |
| 2001/0052006 A1 | 12/2001 | Barker et al. | |
| 2001/0055317 A1 | 12/2001 | Kajizaki et al. | |
| 2002/0016856 A1 | 2/2002 | Tallegas et al. | |
| 2002/0087694 A1 | 7/2002 | Daoud et al. | |
| 2002/0129127 A1 | 9/2002 | Romero et al. | |
| 2002/0141401 A1 | 10/2002 | Albert et al. | |
| 2002/0199014 A1* | 12/2002 | Yang et al. | 709/238 |
| 2003/0009561 A1 | 1/2003 | Sollee | |
| 2003/0014525 A1 | 1/2003 | De Lima et al. | |
| 2003/0023744 A1* | 1/2003 | Sadot et al. | 709/234 |
| 2003/0093496 A1* | 5/2003 | O'Connor et al. | 709/217 |
| 2003/0149690 A1 | 8/2003 | Kudlacik et al. | |
| 2004/0162901 A1* | 8/2004 | Mangipudi et al. | 709/225 |
| 2005/0010754 A1* | 1/2005 | Brendel | 713/153 |
| 2006/0080446 A1* | 4/2006 | Bahl | 709/227 |

OTHER PUBLICATIONS

Homig, Network Working Group RFC: 894; *DARPA Internet Program Protocol Specification* (Apr. 1984).

Information Sciences Institute, University of Southern California, Internet Protocol RFC: 791; *DARPA Internet Program Protocol Specification* (Sep. 1981).

Information Sciences Institute, University of Southern California, Transmission Control Protocol RFC: 793; *DARPA Internet Program Protocol Specification* (Sep. 1981).

Postel, Network Working Group RFC: 879; *DARPA Internet Program Protocol Specification* (Nov. 1983).

*Saunders; Stephen et al.; "The Policy Makers"; Data Communications; pp. 34-35 and 36-56 (even only).

*Postel, J. ed., *Internet Control Message Protocol—DARPA Internet Program Protocol Specification*, RFC: 792, USC Information Sciences Institute, Sep. 1981, pp. 1-4.

*Mogul et al., Path MTU Discovery, Network Working Group Request for Comments:1191, Nov. 1990, pp. 1-3.

* cited by examiner

| 63 | 56/55 | 32/32 | 0 |
|---|---|---|---|
| POLICY | SUPER GROUP ADDR0 | TOTAL SERVICE COUNT ||
| CURRENT SERVICE COUNT || PEAK SERVICE COUNT ||

170 — SERVICE INDEX TABLE ENTRY    FIG. 18

| 63 | 48/47 | 32/31 | 24/23 | 15/14 | 10/9 | 0 |
|---|---|---|---|---|---|---|
| RESERVED | SERVER PORT NO. | RES'D | CURRENT NO. | RES'D | MEMBER NO. ||
| RES'D | BASE GROUP ADDR0 | RES'D | BASE GROUP ADDR1 ||||

180 — SUPER GROUP TABLE ENTRY    FIG. 19

| 63 | 48/47 | 32/31 | 0 |
|---|---|---|---|
| RESERVED | PROXY SERVER PORT NO. | PROXY SERVER IP ADDRESS ||

190 — PROXY SERVER PORT SELECT TABLE ENTRY    FIG. 20

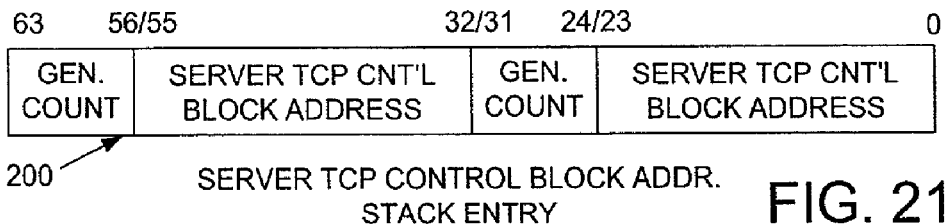
FIG. 21 — SERVER TCP CONTROL BLOCK ADDR. STACK ENTRY (200)
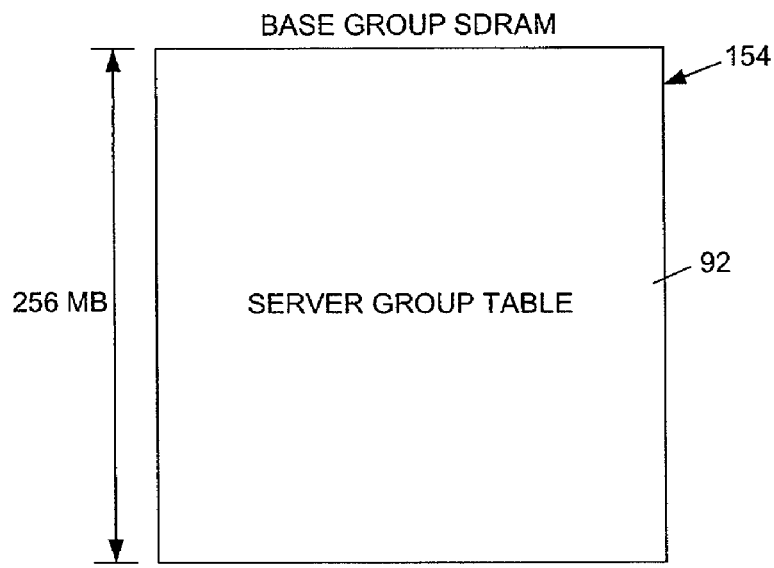
FIG. 22
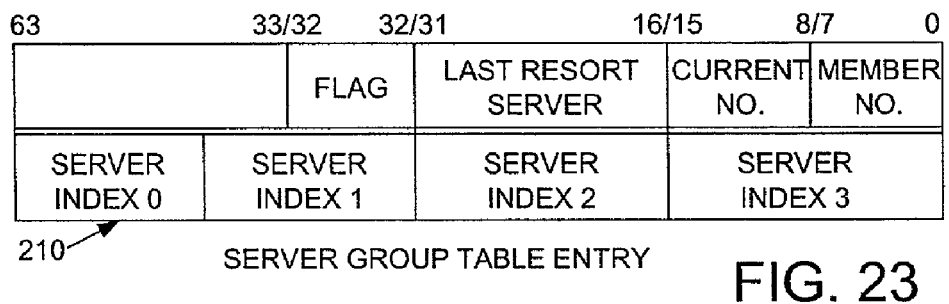
FIG. 23 — SERVER GROUP TABLE ENTRY (210)

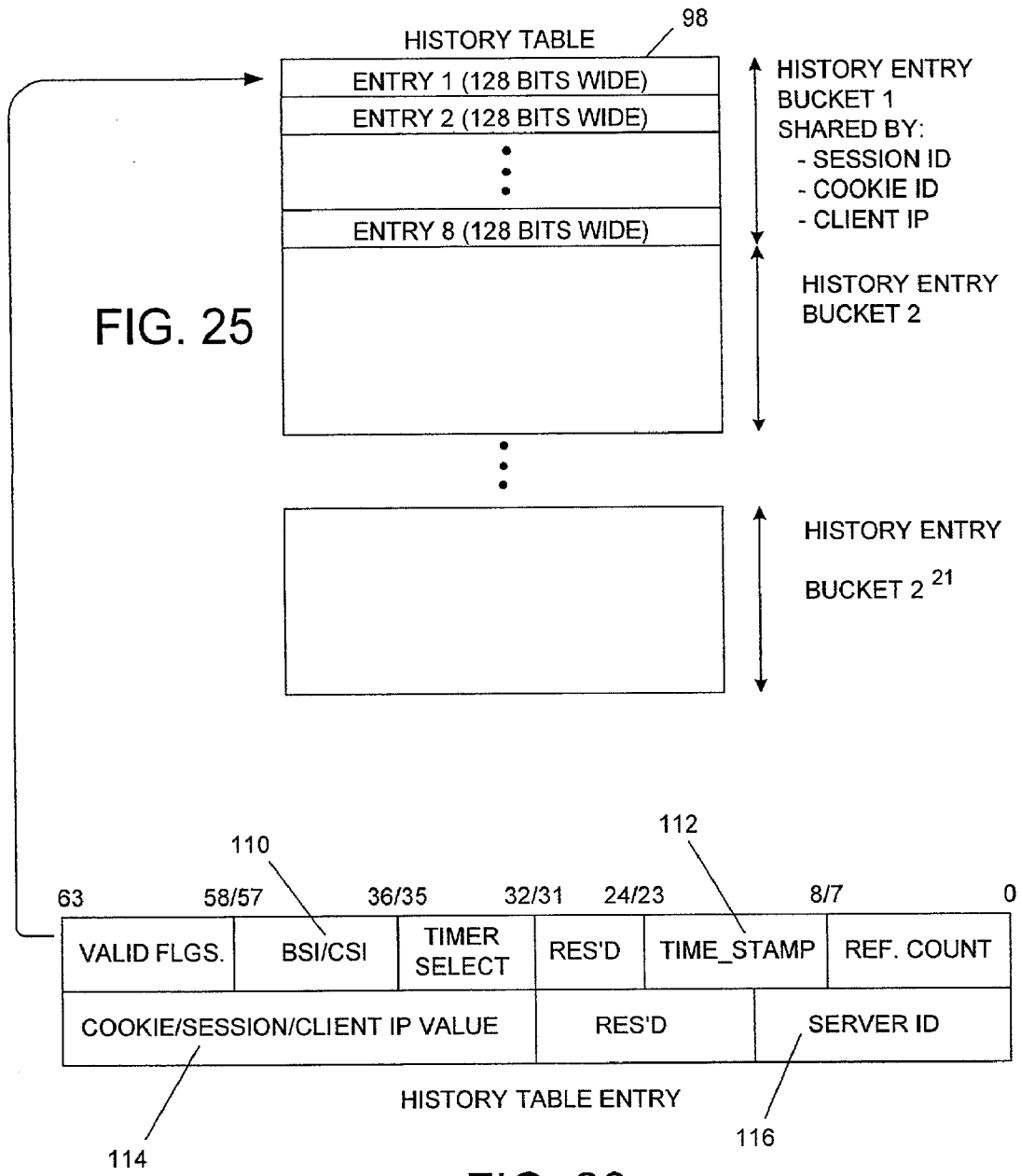

| 33 | 32/31 | 30/29 | 23/22 | 16/15 | 0 |
|---|---|---|---|---|---|
| 01 | SOF | CMD | reserved | Class | Service Policy |
| 00 | MOF | | SrcIP | | |
| 00 | MOF | GEN_CNT | &fTCB | | |
| 10 | EOF | | reserve | | SrcPort |

236 → Service Policy
238 → Class

FIGURE 28

METHOD OF AND SYSTEM FOR ALLOCATING RESOURCES TO RESOURCE REQUESTS BASED ON APPLICATION OF PERSISTENCE POLICIES

This application claims the benefit of U.S. Provisional Application No. 60/355,922, entitled "Network Switch," filed Feb. 11, 2002, and is a continuation in part of U.S. patent application Ser. No. 10/098,957, filed Feb. 11, 2002, both of which are hereby fully incorporated by reference herein as though set forth in full.

RELATED APPLICATIONS

This application is related to U.S. Provisional Application No. 60/355,922 entitled "Network Switch"; U.S. patent application Ser. No. 10/074,462 entitled "Method Of And System For Allocating Resources To Resource Requests"; U.S. patent application Ser. No. 10/073,538 entitled "Method And System For Maintaining Temporal Consistency Of Resources And Data In A Multiple-Processor Packet Switch"; U.S. patent application Ser. No. 10/073,638 entitled "Method And System For Managing Traffic In A Packet Network Environment"; U.S. patent application Ser. No. 10/073,484 entitled "Method And System For Translating Packet Sizes In A Network"; and U.S. patent application Ser. No. 10/098,957 entitled "Switching System." Each of the foregoing applications was filed on Feb. 11, 2002, and are owned in common by the assignee hereof. Moreover, each of these applications is fully incorporated herein by reference as though set forth in full.

1. Field of the Invention

This invention relates generally to data networks, load balancing, and persistent connections, and more particularly to a method of and apparatus for allocating resources to resource requests in accordance with persistence policies.

2. Related Art

Server load balancing is a technique in which client requests for services are distributed across a plurality of servers. In this way, overloading of any particular server is avoided, and more than one server is available to service the requests.

Server load balancing is typically performed by a network appliance called a director or web switch. The director or web switch is programmed with a network address to which the client requests are directed. The director or web switch receives the client requests, and forwards each request to a selected one of the servers. Such a director or web switch serves two main purposes. Firstly, it increases web site availability by allowing for web servers to fail (or be shut down for maintenance) without rendering the web site unavailable. Secondly, it decreases the web site's response time and increases the traffic handling capacity by allowing multiple servers to be used together as a single web site.

Prior approaches to server load balancing typically emphasize avoiding overloading of any particular server, but fail to adequately consider other factors, such as whether a connection already exists or existed in the recent past for the client which has issued a service request. If such a connection exists or existed in the recent past, it may be more efficient to re-allocate the same server to the client in order to handle the current service request rather than allocate a different server based on application of a server load balancing policy.

SUMMARY OF THE INVENTION

A first embodiment of the invention comprises a system for applying a persistence policy to override allocation of a resource based on application of a load balancing policy. The system comprises first logic for determining if a persistence policy is applicable to a service request, and if so, allocating a resource to the request based on application of the persistence policy, and second logic for allocating a resource to the request based on application of a load balancing policy if the persistence policy is determined to be inapplicable as determined by the first logic.

A second embodiment of the invention comprises a system for allocating a resource to a resource request based on application of a persistence policy. The system comprises first logic for determining if an allocation exists or recently expired for the originator of the resource request, and, if so, identifying the resource which was allocated, and second logic for allocating the resource, if identified, to the resource request.

A third embodiment of the invention comprises a system for maintaining a data structure useful for allocating a resource to a resource request based on application of a persistence policy. The system comprises first logic for making an entry in the data structure representing an allocation, and time-stamping the entry with a time-stamp indicating when or about when the allocation was terminated, and second logic for scanning the data structure, and deleting entries for which a time out condition is determined to exist.

A fourth embodiment comprises a system for making an entry in a data structure representing an allocation, the data structure being useful for allocating a resource to a resource request based on application of a persistence policy. The system comprises first logic for deriving a first index from information relating to the resource request if such information is available, and using the first index to make an entry in the data structure representing the allocation if the first index is available. The system also comprises second logic for deriving a second index from information relating to the resource request, and using the second index to make an entry in the data structure representing the allocation.

A fifth embodiment comprises a system for accessing a data structure in order to allocate a resource to a resource request based on application of a persistence policy, entries in the data structure corresponding to allocated resources. The system comprises first logic for deriving a first index from information relating to a resource request if such information is available, using the first index to access the data structure and determine if an entry corresponding to the first index is available, and, if such an entry is available, allocating the resource corresponding to the entry to the resource request. The system also comprises second logic for deriving, if the first index or an entry corresponding to the first index is unavailable, a second index from information relating to the resource request, and using the second index to access the data structure and determine if an entry corresponding to the second index is available, and, if such an entry is available, allocating the resource corresponding to the entry to the resource request.

Method counterparts to each of the foregoing systems are possible. In addition, any combination of any two or more of the foregoing is possible.

In one implementation, where the resources are servers, and resource requests are in the form of packets, a system is provided for maintaining a history table useful for allocating a server to a client-originating resource request in the form of a packet based on application of a persistence policy. Upon or after creation of a connection, the system makes an entry in the history table representing the connection using one of three possible indices derived from information relating to the connection. In particular, the system first analyzes the packet representing the resource request to determine whether a session identifier or cookie identifier is available from the packet. If so, one of these values forms the index to the history table. If not, the client IP address from the packet forms the index into the history table.

The system also time-stamps entries in the history table with a time-stamp indicating the time or approximate time the connection represented by the entry was terminated. The system periodically scans the entries in the history table, comparing the time-stamps for the entries with the current time. If the current time minus the time-stamp value exceeds a programmable time limit (which is programmable depending on the state or type of connection amongst other factors), the system deletes the entry in the table.

When a service request is received, the system derives an index from the packet represented by the service request, and uses this index to determine if a corresponding entry in the history table is present, indicating that a current or recently expired connection exists or existed for the client which issued the service request. To derive the index, the system first analyzes the packet representing the service request to determine if a session or cookie identifier is available from the packet. If available, the system uses one of these values as the index into the table. If neither of these values is available, or a corresponding entry is not present in the history table, the system derives an index based on the client IP address, and uses this value to determine whether a corresponding entry is present, indicating that a current or recently expired connection exists or existed for the client which issued to the service request.

If a corresponding entry is present in the history table, indicating that a current or recently expired connection exists or existed for the client which issued the service request, the system identifies the server for this current or recently expired connection, and allocates it to the service request. If a corresponding entry is not present in the history table, indicating that a current or recently expired connection does or did not exist for the client which issued the service request, the system allocates a server to the request based on application of a load balancing policy or other persistence policy.

One or more entries are then made in the history table representing this newly-created connection. If a cookie or session identifier is available, an entry is made in the table using an index derived from one or the other of these two values. Regardless of whether either or both of these two values are available, an entry is also made in the table using an index derived from the client IP address.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 18 shows an entry of one implementation of a service index table;

FIG. 19 shows an entry of one implementation of a super group table;

FIG. 20 shows an entry of one implementation of a proxy server port select table;

FIG. 21 shows an entry of one implementation of an entry in a proxy server Transmission Control Protocol (TCP) control block address stack;

FIG. 22 is a memory map of one implementation of a base group memory;

FIG. 23 shows an entry of one implementation of a server group table;

FIG. 25 shows one example of the arrangement of the history table;

FIG. 26 shows one example of an entry of a history table bucket member;

FIG. 28 illustrates an example format of a layer 4 resource request; and

DETAILED DESCRIPTION

Example Application

An example application of a system and method according to the invention is described in this section. This example is being provided solely to add context and aid in the understanding of the invention. Other applications are possible, so this example should not be taken as limiting.

Figure 1:
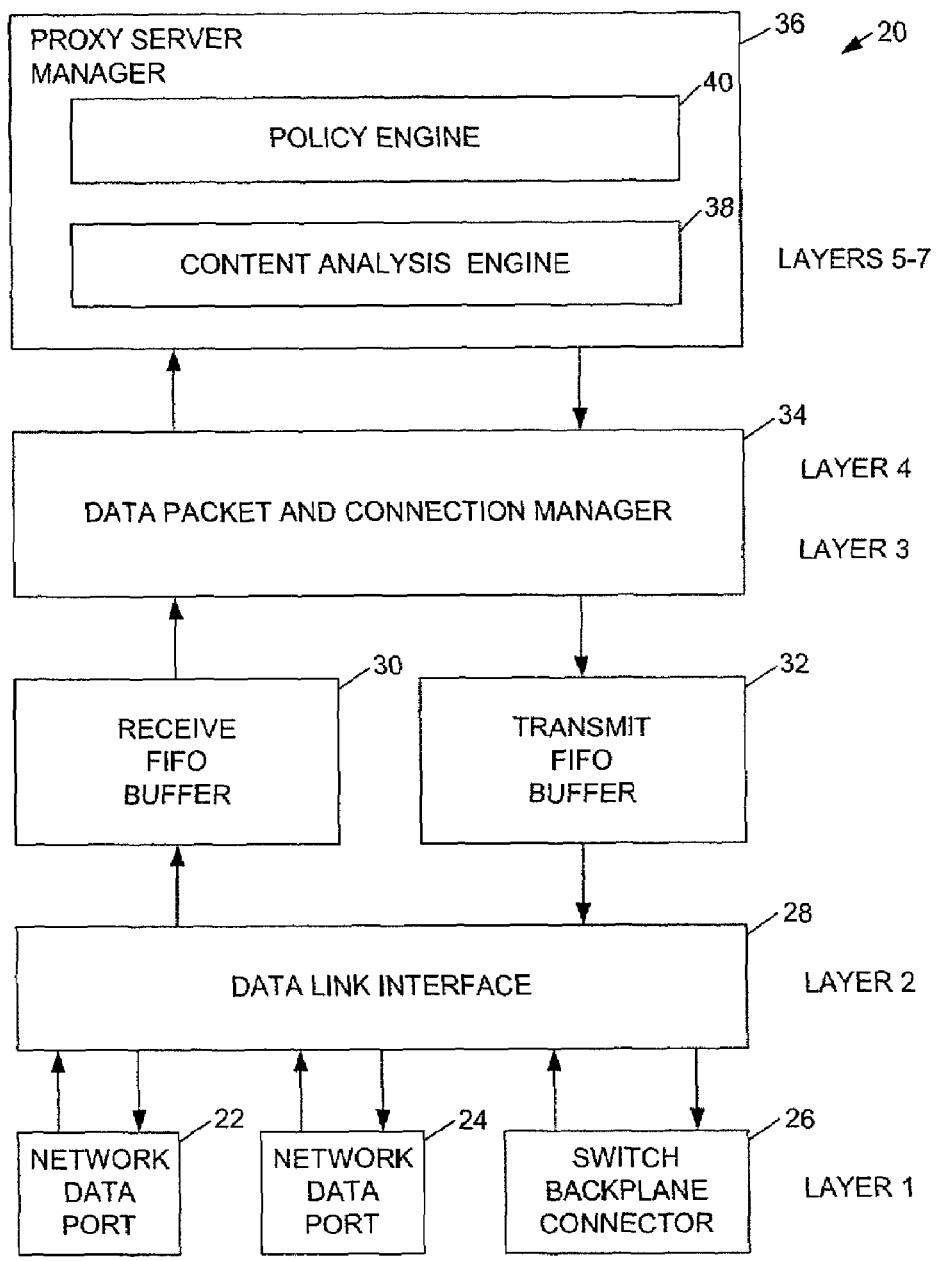
FIG. 1 is a block diagram of one embodiment of a proxy server load balancer incorporating the present invention.

With reference to FIG. 1, there is shown a block diagram of one embodiment of a proxy server load balancer 20 incorporating the present invention. The functional blocks of the proxy server load balancer 20 are organized into various layers 1 to 5 corresponding to the Reference Model for Open Systems Interconnection (OSI) promulgated by the International Standards Organization (ISO). Layer 1 is the physical layer, layer 2 is the data link layer, layer 3 is the network layer, layer 4 is the transport layer, layer 5 is the session layer, layer 6 is the presentation layer, and layer 7 is the application layer.

The physical layer 1 includes the electrical and mechanical characteristics of the proxy server load balancer 20 that are used to transfer data bits to and from the data network. In particular, in one implementation, the proxy server load balancer 20 has at least two network data ports 22, 24 and a switch backplane connector 26, which can be used in various ways to connect the proxy server load balancer to a data network, as further described below with reference to FIGS. 2 to 4.

The data link layer 2 includes a data link interface 28 that implements at least one protocol for error-free communication with other devices across the data network. For example, in one implementation, the data link layer 2 may implement a gigabit Ethernet protocol. Associated with the data link interface 28 is a receive first-in first-out (FIFO) buffer 30 and a transmit FIFO buffer 32, which serve as an interface between the data link layer 2 and the network layer 3. The network layer 3 includes a data packet and connection manager 34 that implements a protocol for routing, congestion control, and user-network communication. For example, the data packet and connection manager 34 may implement the Internet Protocol (IP).

The transport layer 4 implements functions and classes of service for error-free communication between hosts across the sub-network. The data packet and connection manager 34 also implements the transport layer 4. For example, the data packet and connection manager 34 may implement the Transmission Control Protocol (TCP) and the User Datagram Protocol (UDP).

The layers 5-7 include a proxy server manager 36 that implements process-to-process communication, error recovery, and session synchronization. In particular, in one embodiment, the proxy server manager 36 has a content analysis engine 38, which analyzes the content of Hyper-Text Transfer Protocol (HTTP) headers for information relevant to routing policies. The proxy server manager 36 also has a policy engine 40, which applies a load balancing policy or a persistence policy to select a server to serve each client request forwarded by the proxy server load balancer 20.

In one embodiment, the functional blocks of the proxy server load balancer of FIG. 1 may be implemented in hardware, software, or a combination of hardware and software. In another embodiment, the functional blocks of the proxy server load balancer 20 in FIG. 1 are implemented in dedicated hardware to handle all aspects of web server load balancing. In particular, the proxy server manager 36 and the data packet and connection manager 34 may be comprised of finite state machines (such as the content analysis engine 38 and the policy engine 40) that operate in parallel or pipelined fashion. In one implementation, the finite state machines are comprised of digital logic and state and control registers implemented in field programmable gate arrays (FPGAs), and the state machines operate upon various tables in static random access memory (SRAM) or synchronous dynamic random access memory (SDRAM), as will be further described below. The state machines and state memory could alternatively be implemented in other customizable logic such as application specific integrated circuits (ASICs), or even full-custom circuits. In this particular implementation, because there are no CPUs involved in the data path of the proxy server load balancer 20, there are no bottlenecks for CPU time or CPU memory bandwidth. This allows the proxy server load balancer to handle connections at the physical media rate (in this case gigabit line rate), and scale to millions of concurrent connections. Instead of focusing on connection budgets, the web site administrators can focus on the web site.

One application for the proxy server load balancer 20 is to balance Internet client service requests to a web site including a multiplicity of servers. In this case, the proxy server load balancer 20 creates a level of abstraction between the Internet and the servers. This is done by configuring a Virtual Internet Protocol address (VIP) on the proxy server load balancer 20 which corresponds to the Directory Name Service (DNS) entry for the web site. This results in all traffic for the site being sent to the proxy server load balancer 20. The proxy server load balancer applies policies or client-server stickiness to decide how to forward the client requests, and then forwards each client request to a selected one of the servers.

Figure 2:
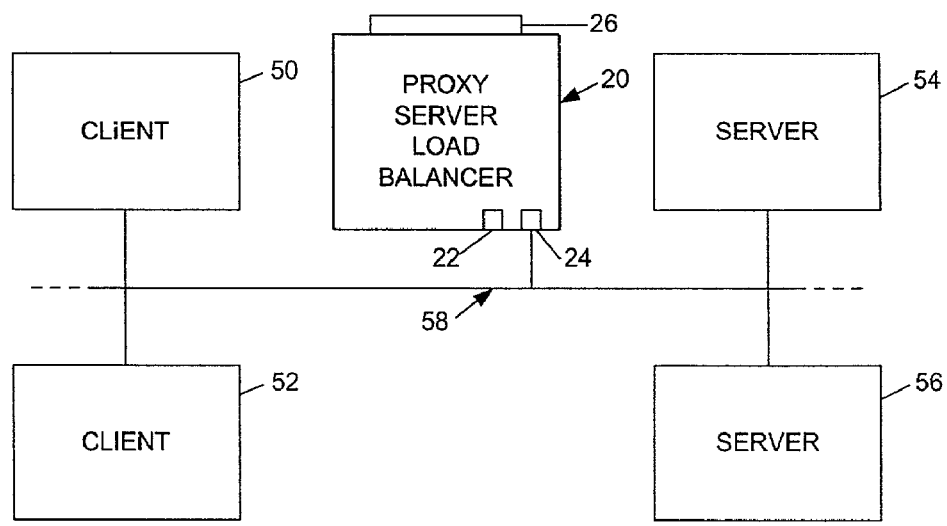
FIG. 2 is a block diagram showing a first way of attaching the proxy server load balancer of FIG. 1 to a data network.
Figure 3:
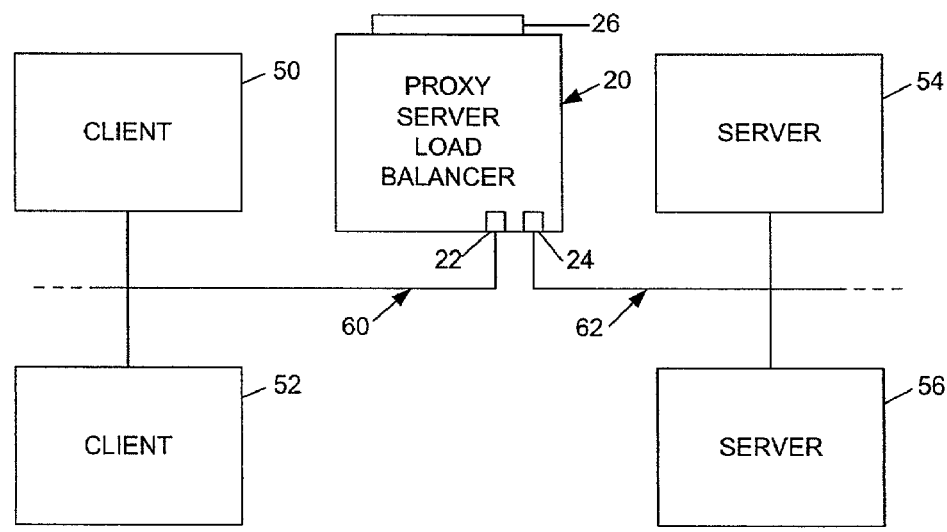
FIG. 3 is a block diagram showing a second way of attaching the proxy server load balancer of FIG. 1 to a data network.

In a preferred implementation, the proxy server load balancer 20 is physically configured as a circuit board which can be deployed as a network appliance or as a blade in a gigabit Ethernet chassis switch. The deployment of the proxy server load balancer 20 as a network appliance is shown in FIGS. 2 and 3. The deployment of the proxy server load balancer 20 as a blade in a gigabit Ethernet chassis switch is shown in FIG. 4.

With reference to FIG. 2, for example, a common data link 58 links the proxy server load balancer 20 to the clients 50 and 52 and servers 54 and 56. The proxy server's network data port 24 is linked directly to the common data link 58. In this case, the clients 50 and 52 may direct their requests to a selected one of the servers 54 and 56. The clients 50 and 52 may also direct their requests to the proxy server load balancer 20 by addressing the network data port 24. In this case, the proxy server load balancer may select a respective one of the servers to handle each request and forward the request to the selected server.

With reference to FIG. 3, for example, the network has been reconfigured so that a first data link 60 links the clients 50 and 52 to the proxy server's network data port 22, and a second data link 62 links the servers 54 and 56 to the proxy server's network data port 24. In this case, the clients may not directly access the servers. Instead, the clients may access the servers only by addressing the proxy server's network data port 22. In this case, the proxy server load balancer 20 may select a respective one of the servers to service each client request.

Figure 4:
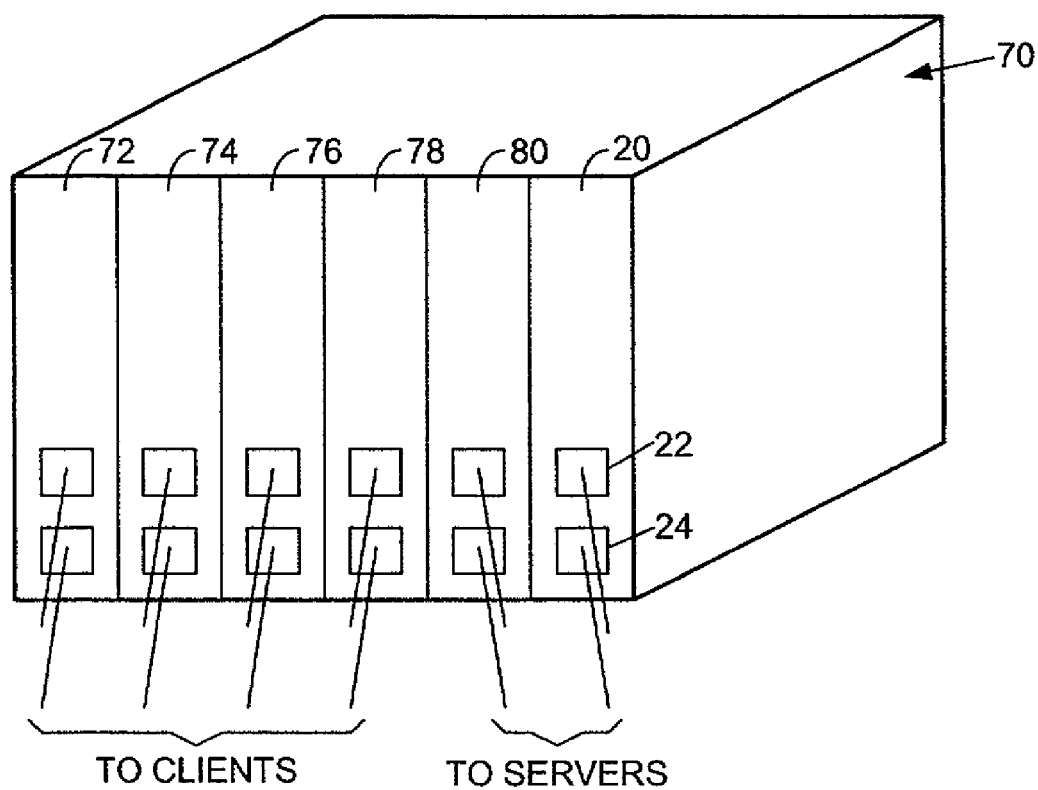
FIG. 4 is a pictorial view showing how the proxy server load balancer of FIG. 1 can be installed into a web switch rack.

With reference to FIG. 4, the proxy server load balancer 20 may be inserted into a gigabit Ethernet chassis switch generally designated 70. The network data ports 22 and 24 link the proxy server load balancer 20 to a multiplicity of servers. The gigabit Ethernet chassis switch 70 has a number of conventional circuit board switch blades 72, 74, 76, and 78 having similar network data ports linked to clients. The blades 72, 74, 76, and 78 switch requests from the clients to the backplane connector (26 in FIGS. 1, 2, and 3) of the proxy server load balancer 20, and the proxy server load balancer 20 then forwards each request to a respective server directly linked to the network port 22 and 24. It is also possible to configure the proxy server load balancer 20 to receive a client request from its backplane connector (26 in FIGS. 1, 2 and 3), translate the destination Internet Protocol (IP) address and port address of the request, and return the request back to the backplane connector, for further processing by the routing function of the gigabit Ethernet chassis switch 70.

FIG. 4 shows a second blade 80 having direct links to network clients. The blade 80 could be either a conventional circuit board switch blade or a proxy server load balancer similar to the proxy server load balancer 20. When there are more than one proxy server load balancer blade in the gigabit Ethernet chassis switch 70, each proxy server load balancer blade may perform server load balancing independently of the other proxy server load balancer blades.

In one implementation, the data packet and connection manager 34 in FIG. 1 implements a TCP/IP stack. Client traffic arriving at the data packet and connection manager 34 is initially classified as to which level of service is being requested (service index) and who is making the request (client identifier). For level 4 service (i.e., non content-enabled service), these values are used directly in the proxy server manager 36 for implementation of policy considerations. For level 5 to level 7 service (i.e., content-enabled service) these initial values are may be qualified inside the proxy server manager 36 according to content and history based rules for implementing certain content-based and persistence policies. Once they have been qualified, a final set of values may be computed and used for implementation of policy considerations. For HTTP, content rules that may modify the service index relate to factors such as the Universal Resource Locator (URL) path or the host (domain) represented or indicated in the request, and content rules that modify the client identifier include a cookie identifier represented or indicated in the request. Secure HTTP (HTTPS) is also supported, and the client identifier may be modified by a Secure Socket Layer (SSL) identifier.

In the case of layer 4 service, the proxy server load balancer 20 may use a Network Address Translation (NAT) approach. When a client requests a new connection to the web site at the virtual IP address of the proxy server load balancer 20, the proxy server load balancer selects a respective one of the servers based on the load balancing policy associated with the web site. The proxy server load balancer 20 will then rewrite the destination IP address of the request to point to the server selected to handle the request, and set the source IP address of the request to point to an IP address of the proxy server load balancer. When the selected server responds to the request, the proxy server load balancer 20 receives the response and rewrites the response so that it will appear to originate from the virtual IP address of the proxy server load balancer, and forwards the response to the client.

UDP is handled as a layer 4 service. For UDP, a message format such as the Domain Name System (DNS) is used so that the server-return traffic is a single response stream sent back to the same client request port number.

In the case of layer 5-7 service, the proxy server load balancer 20 first acts as a proxy for the server by acting as an endpoint for the TCP/IP connection from the client, so that the proxy server load balancer can look at the content of the request being made by the client. The proxy server manager (36 in FIG. 1) takes the content being requested, along with the domain to which the request pertains, and applies policy rules described further below with reference to FIG. 5. During this time, the proxy server load balancer 20 buffers data associated with the request, and acknowledges receipt of the data as appropriate. Based on the outcome of the policy decision, the proxy server load balancer 20 establishes a TCP connection with the server selected to process the request. To establish a connection with the server, the proxy load balancer 20 sends a SYN packet to the server, and, after the server returns a SYN-ACK, sends an ACK to the server, thus completing the establishment of the connection. Thus, it can be seen that, during the connection establishment phase, the proxy server load balancer 20 acts as a proxy to both the server and the client.

Once a connection is established between the proxy server load balancer 20 and the selected server, the proxy server load balancer forwards the buffered data associated with the request to the selected server, and receives the ACK packet returned by the server. The selected server may also return data to the proxy server load balancer 20 for sending on the client. In this case, the proxy server load balancer 20 translates the IP source address, port number, TCP sequence, and acknowledgement numbers, and forwards the data to the client. In this fashion, during the data phase, the proxy server load balancer 20 operates as a proxy for the server, but not for the client.

Figure 5:
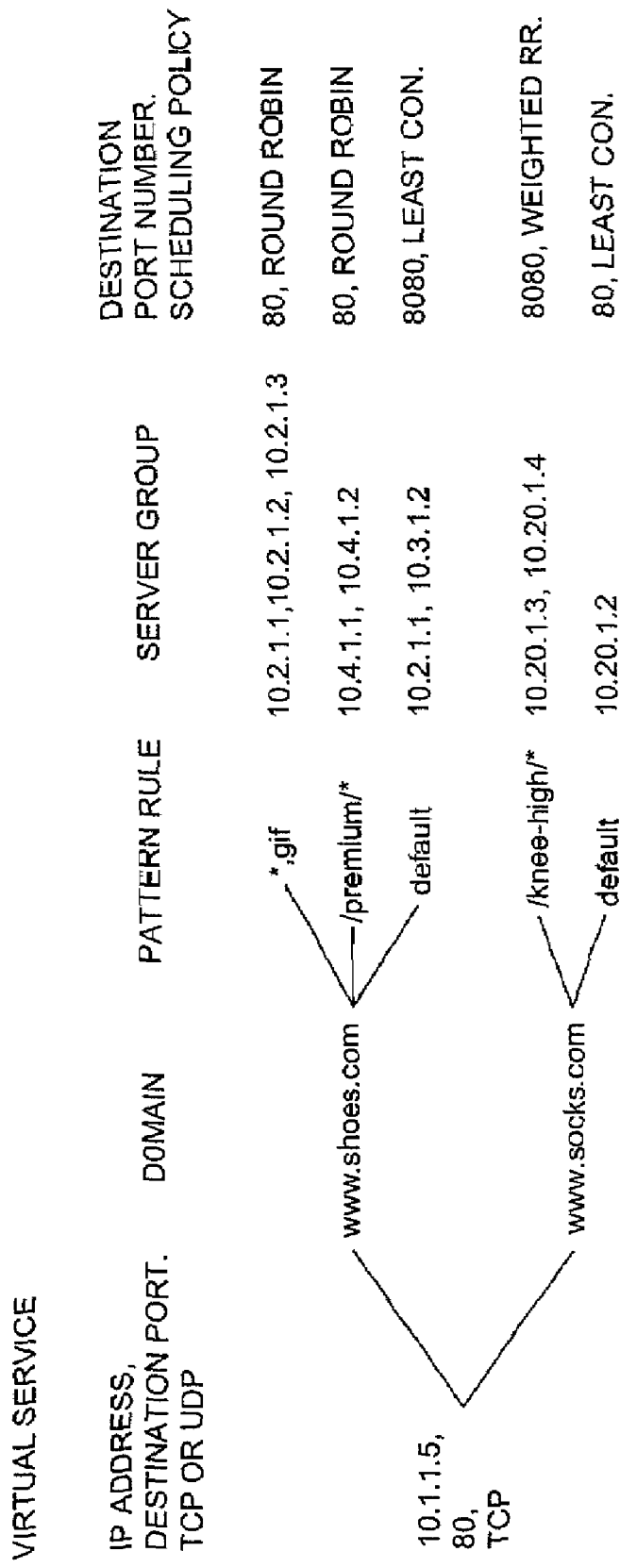
FIG. 5 shows an example of decision rules applied by the proxy server load balancer of FIG. 1 when making forwarding decisions based on content of client requests.

FIG. 5 shows an example of layer 5-7 policy rules. The layer 5-7 policy rules allow the proxy server manager (36 in FIG. 1) to make forwarding decisions based on the domain name requested by the user, and string patterns in the URL. The layer 5-7 policy rules are keyed off unique combinations of Virtual IP address, destination port number, and protocol (TCP or UDP) found in the client request. The proxy server manager then looks into the client request and determines the domain. Once the domain has been determined, the URL is matched against a list of pattern rules. Each of the pattern rules has its own server group associated with it. Once a match has been found, the user-configured load balancing policy or scheduling policy is applied to the server group, and the client request is forwarded to the selected server at the user-configured destination port number.

The layer 5-7 pattern rules permit HTTP traffic to be load balanced on the basis of the destination domain only, or a combination of the destination domain and URL. The content analysis engine (38 in FIG. 1) examines the client request HTTP header (up to 1460 bytes) for domain and URL strings, and the URL string is then checked against user-configured string patterns to make a load balancing decision. HTTPS traffic is checked for SSL 3.0 session-id strings by the layer 5-7 mechanisms, in order to provide session persistence. Preferably, the HTTPS traffic is not decrypted by the proxy server load balancer 20, so in the absence of persistence it is load balanced at layer 4, based on the Virtual IP and destination port numbers, and the specified protocol.

As shown in FIG. 5, the string patterns for the URLs can contain a single "*" as a wildcard adjacent to a "/" or "." delimiter. The patterns can be matched in the following ways: keyword, /keyword, keyword/, keyword1/*/keyword2, and a default action. Each pattern rule (or domain name if no pattern rules are used) has its own associated server group, scheduling policy, and rewrite port number.

The policy engine (40 in FIG. 1) supports a number of scheduling policies and persistence policies. The scheduling policies included hashing, round robin, weighted round robin, utilization percentage, least connections, weighted least connections, and priority scheduling. Other scheduling policies may also be used.

Hashing uses the IP address of the client to assign the request to a given Virtual IP deterministically within a server group. This has the advantage of always sending clients (who keep the same domain name or host IP) to the same server. This allows for persistent connections, but may have problems if an excessive number of users originates from the same domain name or IP address, as could be the case with very large Internet providers such as aol.com and other mega proxy sites.

Round robin distributes client requests evenly across the server group. The first client connection should be sent to the first server, the second to the second server, and so on until each server has a connection. Then the next connection should be sent to the first server, etc. This policy is the simplest way of balancing web traffic, and is best suited for environments where all the servers have about the same performance level and all serve the same content.

Weighted round robin is similar to round robin, but applies a static weight to each server. The weight is set during configuration. For example, if server X has a weight of two, and server Y has a weight of one, then server X will receive two connections for each connection given to server Y. This scheduling policy can be very useful if all servers are serving the same content, but some servers are faster than others.

Utilization percentage distributes client requests based on utilization of the servers available in the server group (defined by current connections divided by the maximum number of connections). This policy allows for very granular control over the number of connections dispatched to each server.

Least connections distributes client requests based on the server with the least connections currently open.

Weighted least connections distributes client requests based on the number of connections currently open and a static weight assigned to each server. The weight is assigned during configuration. For example, the weight is based on the processing speed or connection bandwidth of the server. Connections are then distributed using the servers with the least open connections by weight. This scheduling policy has the advantage of not overloading older, slower servers with too many connections.

Priority scheduling distributes client requests by static priorities assigned to each server in the server group. The priorities are assigned during configuration.

The persistence policies include self-identification stickiness, cookie hashing stickiness, client-based persistence, cookie-ID based persistence, and session-ID based persistence. (The term "ID" in the foregoing is shorthand for "identifier".).

For self-identification stickiness, the content analysis engine (38 in FIG. 1) extracts a server ID from cookie information. In particular, the cookie value following a matched cookie name and the "=" character is found to be a server IP/MAC address. The policy engine (40 in FIG. 1) selects the server having the extracted server IP/MAC address to service the client request if this server is available.

For cookie hashing stickiness, the content analysis engine (38 in FIG. 1) extracts server-related information from cookie data and uses the information to calculate a hash value. In particular, the cookie value following a matched cookie name and "=" character is found to be server-related information. If this value is presented, and the same service is requested, then the policy engine (40 in FIG. 1) selects the server pointed to by the hash value if this server is available. In particular, the policy engine uses the hash value to get a server ID by looking up a super group and a basic group, which are further described below.

Client-based persistence uses the client IP address to direct the client connection to the server that the client connected to previously. Since the client IP address can change, it is preferred to use another persistence feature when possible.

Cookie-ID based persistence uses cookie information stored by the client to direct the client connection to the server that issued the cookie.

Session-ID based persistence derives a session ID from the packet or packets which spawned the request for service, and used this session ID to direct the client connection to a server.

Figure 6:
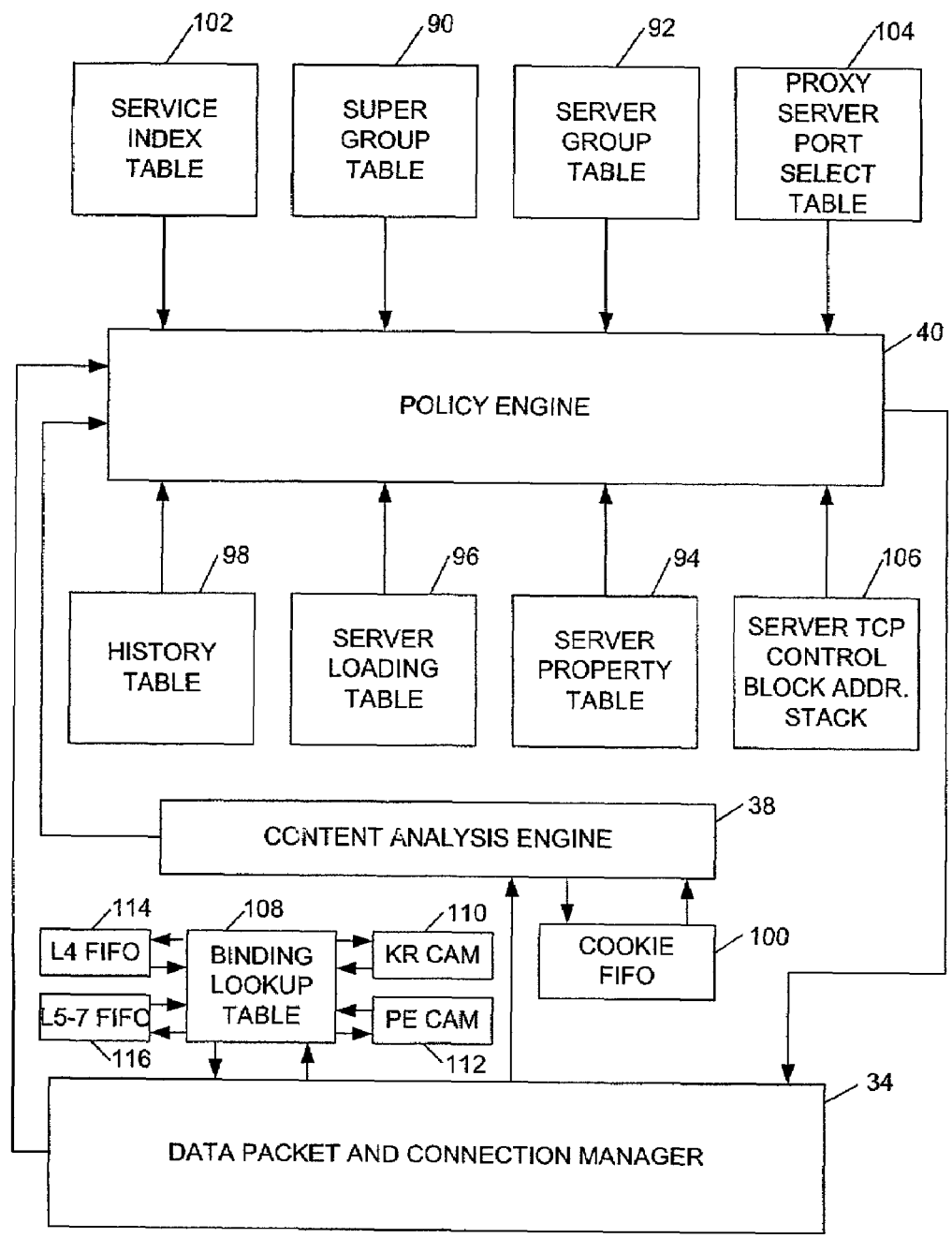
FIG. 6 is block diagram showing one embodiment of the policy engine introduced in FIG. 1, and various functional blocks used with the policy engine.

FIG. 6 shows various functional blocks used with one embodiment of policy engine 40. In order to select a server for servicing each client request, the servers are arranged in a hierarchy including groups of servers, and super groups of the groups of servers. In this fashion, the servers are configured into overlap-able, arbitrary subsets that match configured content rules. Information about the super groups is stored in a super group table 90, and information about the server groups is stored in a server group table 92. Each server within a given server group is capable of responding to a given service request type, as is each of the servers within the corresponding super group. This architecture allows great flexibility while requiring relatively small amounts of memory for the server group and super group tables. The static properties such as bandwidth, maximum number of requests supported, etc., of each server are stored in a server property table 94, and the dynamic properties including current loading of each server is stored in a current server loading table 96. Real-time state kept for the policy engine 40 includes a history table 98, which stores a history of bindings of the client identifiers to the selected servers for various service request classes. The history information in the history table 98 is supplemented by cookie information in a cookie FIFO buffer 100 associated with content analysis engine 38. Cookie FIFO buffer 100 stores cookie information that is accessed by content analysis engine 38 to implement the self-identification stickiness and cookie hashing stickiness policies as described above. In one implementation example, cookie FIFO buffer 100 is a 512×64 bit dual-port FIFO.

As introduced in FIG. 5, the application of the pattern rules by the content analysis engine 38 results in each connection being assigned a particular service having a pre-assigned server super-group and scheduling policy. Each service is identified by a service index. A service index table 102 is configured to contain a server super group address and a load balancing policy for each service index. The policy engine 40 selects a server group within the assigned server super-group, and then applies the policy in view of the static and loading characteristics of the candidate servers to select a server to handle the client request, and to route the client request to the selected server. For routing of the client request, the policy engine 40 accesses a proxy server port select table 104 organized as a FIFO buffer of assigned IP addresses and ports of the proxy server load balancer 20, and a server TCP control block address stack 106 organized as a FIFO buffer of addresses of corresponding server TCP control blocks.

The TCB control blocks and related information about the TCP connections for the client requests is maintained by a binding lookup table 108 associated with the data packet and connection manager 34. The binding lookup table 108 maintains a list of open connections in a content addressable memory (KR CAM) 110. The key to the KR CAM 110 is a 5 tuple (source IP address, destination IP address, source port, destination port, protocol) extracted from incoming IP data packets. The contents of the KR CAM are pointers, each of which points to a respective binding lookup table data structure (TCB), which describes the state of a connection. The TCB data structure has one format for L4 connections and another format for L5-7 connections. As data packets are received by the data packet and connection manager 34 from the data link interface 24 in FIG. 1, the data packets are examined by the binding lookup table 108. If a packet refers to an existing connection, and L4 service is desired, then the binding lookup table 108 will find a corresponding entry in the KR CAM 110, and will return the KR CAM pointer of the TCB to the data packet and connection manager 34, so that the corresponding TCB can be accessed during handling of the packet.

If the data packet passed from the data link interface 24 to the data packet and connection manager 34 is associated with a new connection, then there will be no corresponding entry in the KR CAM 110. In this case the binding lookup table references a content addressable memory (PE CAM) 112 with a 3 tuple (destination IP address, destination port, protocol) to determine whether this new connection can be supported by the proxy server load balancer 20, whether the connection is requesting an L4 (non content aware) or L5-7 (content aware) service, and which particular service is being requested. If the client is requesting a supported service, then the binding lookup table 108 obtains a new pointer to an L4 or L5-7 TCB from an L4 free-pointer FIFO 114 or an L5-7 free-pointer FIFO 116, and sends the new pointer to the data packet and connection manager 34.

In the case of a new L4 connection, the data packet and connection manager 34 sends information about the requested service to the policy engine 40. This information is included in an L4 service request to the policy engine 40. In the case of a new L5-7 connection, the data packet and connection manager 34 sends information about the requested service to the content analysis engine 38. The content analysis engine 38 analyzes the content of the data packet to extract additional information pertaining to the requested service, and formulates an L5-7 service request sent to the policy engine 40.

When a connection is terminated, the data packet and connection manager 34 returns the corresponding TCB pointer to the binding lookup table 108, and the binding lookup table 108 removes the corresponding KR CAM entry, and places the TCB pointer on the L4 or L5-7 free-pointer FIFO.

The policy engine 40 receives the L4 service requests from the data packet and connection manager 34 and the L5-7 service requests from the content analysis engine 38. The policy engine 40 binds each service request to a specific server, assigns a proxy server load balancer IP address and port, and returns the server, IP address, and port assignments to the data packet and connection manager 34 so that the data packet and connection manager 34 may reformat the client request and forward the client request to the selected server. The policy engine 40 supports both L4 and L5-7 transactions through the same mechanism, and, in one implementation example, can handle a peak capacity of 1.5 million transactions per second. Each service can be assigned any number of up to 65,536 (i.e., 64K) total servers and may share servers with other services. Each server can belong to any number of services because server loadings are global and not linked to a specific service.

In one implementation, the policy engine 40 receives the L4 and L5-7 service requests as service index pointers uniquely specifying one of 64K available L4 services or 4 million minus 64K available L5-7 services. The policy engine 40 gives priority to the L4 service requests so that the data packet and connection manager 34 need not provide any data storage for Layer 4 data. (The data packet and connection manager 34 provides data storage for Layer 5-7 data.) The policy engine uses the service index to index the super group table 90, which contains pointers for a group of server groups that belong to the same service. The pointers from the super group table 90 index into server group table 92 to determine what servers are available to service the request. A load balancing policy, received as part of the service request, and any persistence policy, as provided by the history table 98, are then enforced to determine which of the available servers is chosen and in what manner this decision is made. In the event that a cookie (L5-7 only) is present or client ID is present (client IP address for L4 and session ID for L5-7) and the persistence policy forces the request to a specific server, the service index table 102 and the server group table 92 are bypassed and a server ID is retrieved from the history table 98. In one implementation, each policy is enforceable within sufficient time to allow 1.5 million L4 and 300,000 L5-7 transactions per second. The next available proxy server port is then popped off the proxy server port select table 104 and used to dispatch the request. In the case of a layer 5-7 transaction, a next available server TCB address pointer is popped from the server TCB control block address stack 106. (For an L4 transaction, the data packet and connection manager 34 maintains a Server TCB address.)

Figure 7:
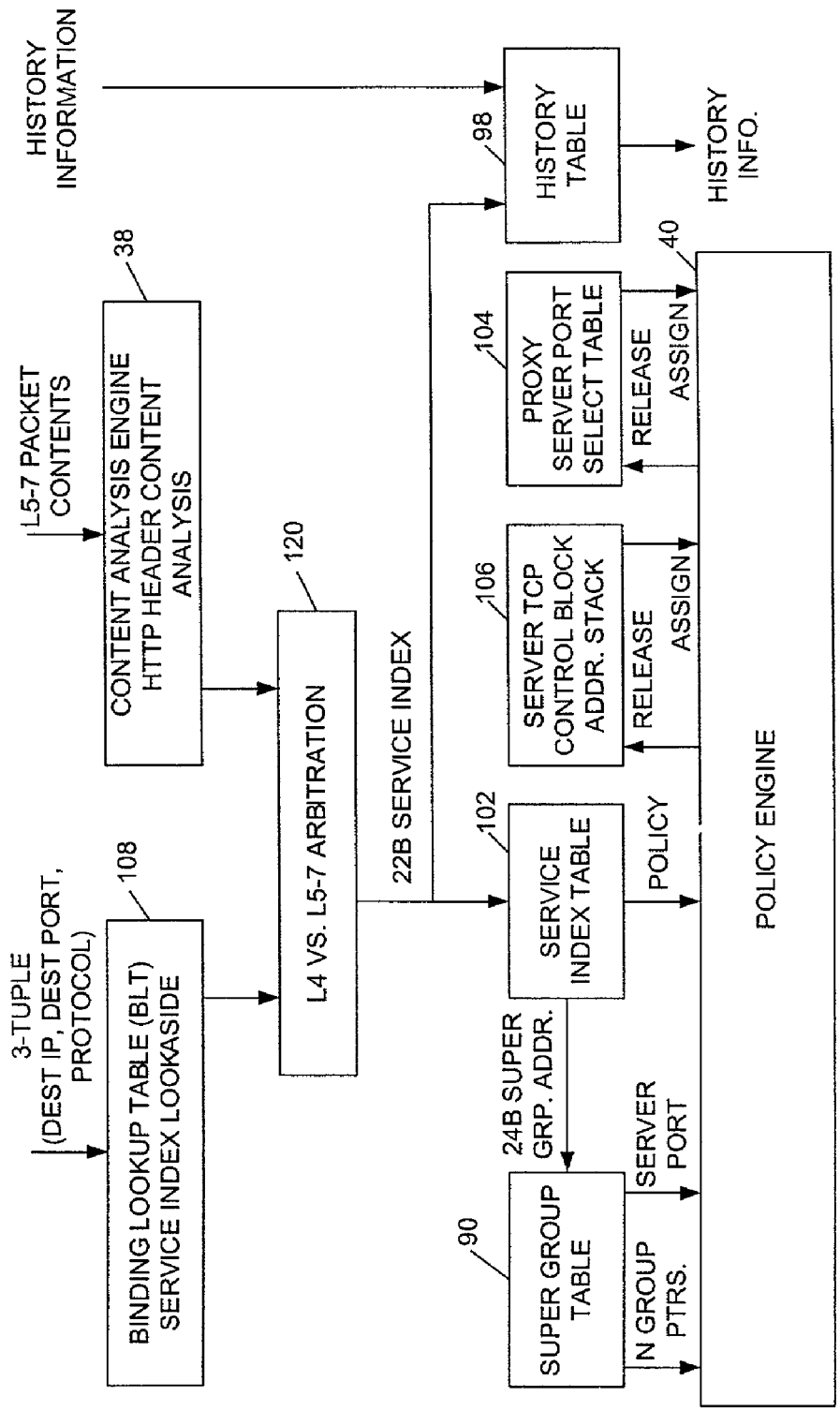
FIG. 7 is a first sheet of a flow diagram showing the processing of information by one embodiment of the policy engine.
Figure 8:
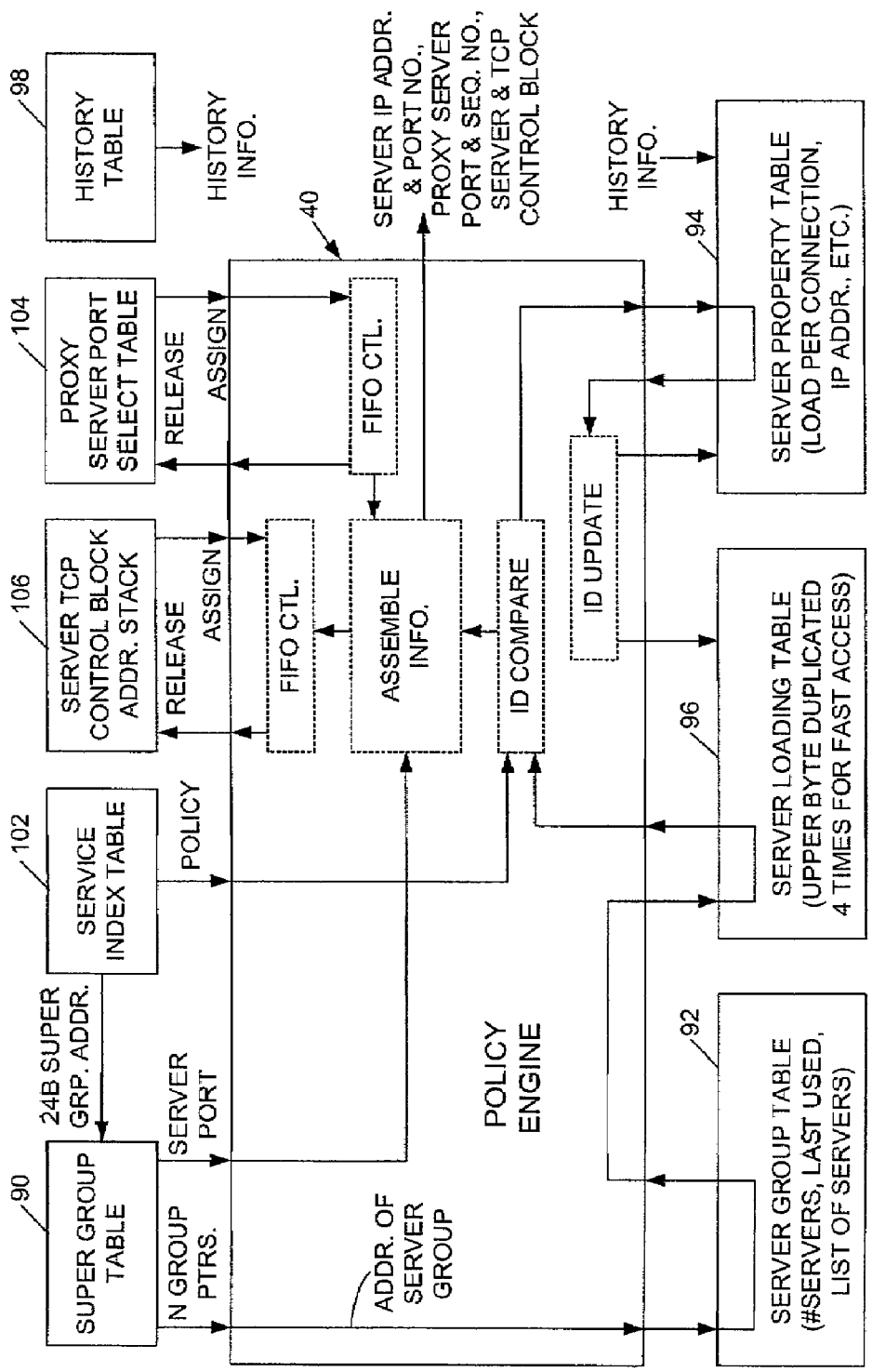
FIG. 8 is a second sheet of the flow diagram begun in FIG. 7.

FIGS. 7 and 8 further show the data flow when the policy engine 40 processes a service request. A service request originates from the binding lookup table 108 being accessed by a 3-tuple (destination IP address, destination port, and protocol) for an L4 request, or from the content analysis engine 38 analyzing the HTTP header of a data packet for an L5-7 request. The policy engine 40 is also responsive to a service delete for both an L4 or L5-7 connection close. If both an L4 or L5-7 request occur concurrently, in one embodiment, the policy engine 40 performs arbitration 120 and gives priority to the L4 request. In one implementation, both L4 and L5-7 requests provide a 22 bit service index to the policy engine 40 which uses this service index to index the service index table (102 in FIG. 8).

If a persistence policy is not applicable, then a load balancing policy is employed. Persistence attempts to force the client request to the server that handled the last request from the same client. Stickiness for an L4 request is based on the client identity. For an L5-7 request, cookie-based or session-based stickiness is attempted. System administrators may attach server identifiers in their cookies. Therefore, implementation of cookie-based stickiness may first be attempted based on any server identifier embedded in a cookie. However, if a server identifier is not found in the cookie, then an attempt may be made to apply a stickiness policy based on hashing of other information in the cookie.

Providing an exhaustive memory for the possibility of all 4 million services using all 64K servers would require half a terabyte of storage. The super group table 90 and the server group table (92 in FIG. 8) provide a means of packing the server grouping information by assigning each service a direct memory index into the super group table 90 and a policy code indicating the load balancing policy. In one embodiment, the super group table 90 contains a count of the number of server groups and the physical address pointer to each group of servers in the server group table 92. In one embodiment, the server group table 92 contains a count of the number of servers assigned to that server group and a list of server indices which index to the current server loading table 96 and server property table 94.

Server information, including loading, the maximum connection count, and the associated IP address, is maintained in the server loading table 96. Server loadings are read as soon as the server identifiers arrive from the server group table 92. In one embodiment, the server loading table 96 is organized such that server loadings are available in groups of four to match the bandwidth of the server group table 92. After a server is chosen, the corresponding loading is updated when appropriate.

Each entry in the server loading table 96 may also include one or more flags indicating the "health" of the corresponding server indicating, for example, whether the server is unavailable due to a catastrophic failure, or failure to pass a prescribed health check. The policy engine 40 may access these one or more flags, and avoid allocating the corresponding server to a request if the flags indicate a failure or unhealthy condition.

In one embodiment, the final output from policy engine 40 to the data packet and connection manager 34 is the IP address and port number of the selected server, the proxy server load balancer IP address and port number assigned to handle the client request, a source Initial Sequence Number (ISN), and the TCP control block address pointer associated with the transaction. In one embodiment, the policy engine 40 generates a new Initial Sequence Number by adding 32K value to the previous ISN every time a new binding is sent for an L5-7 service request. (For an L4 service request, the data packet and connection manager 34 just forwards the Initial Sequence Number between the servers and clients).

Figure 9:
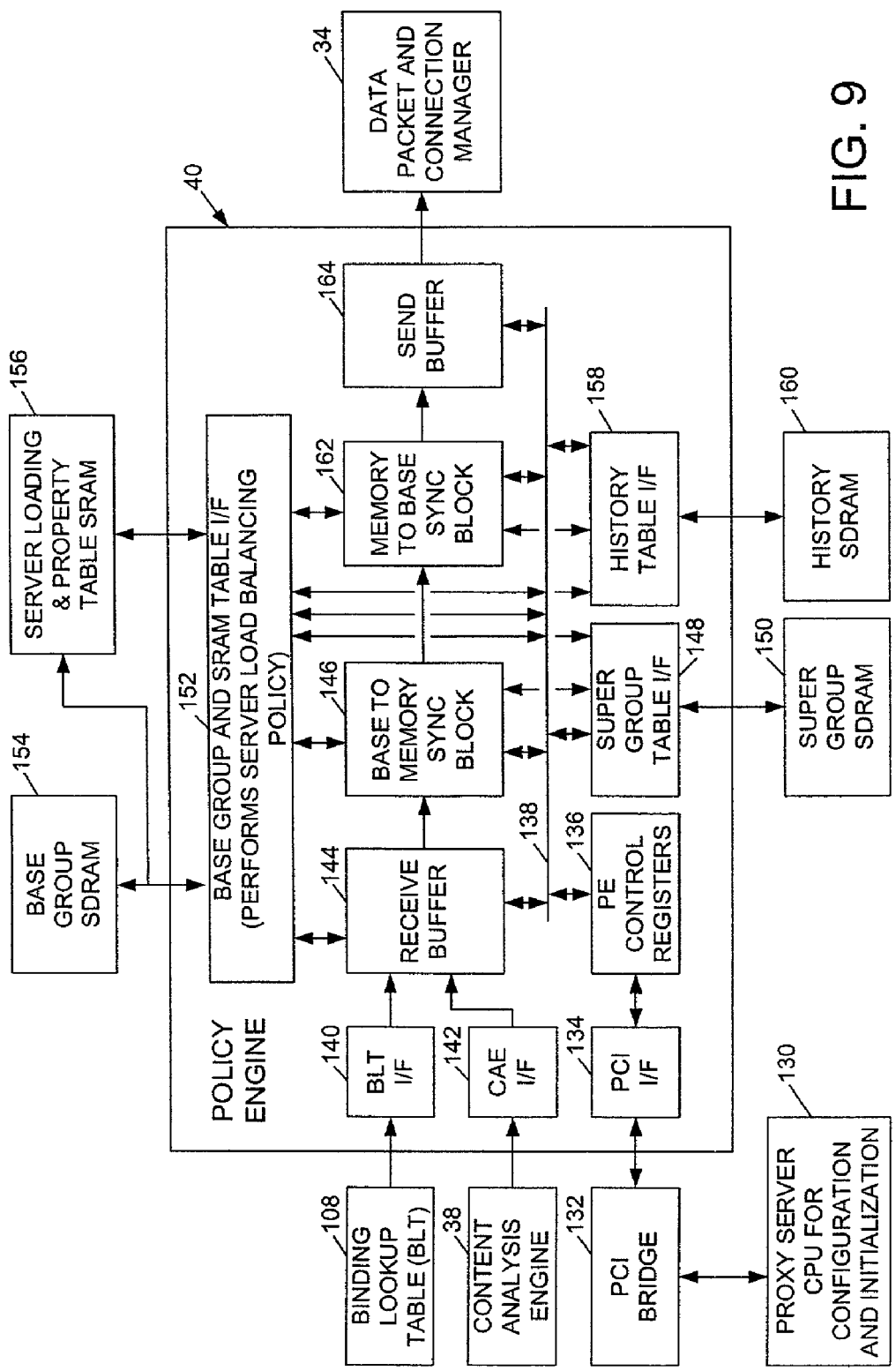
FIG. 9 is a block diagram showing various functional blocks within one embodiment of the policy engine.

FIG. 9 shows various functional blocks within one implementation of the policy engine 40. The policy engine 40, and other state machines and tables in the proxy server load balancer, are configured and initialized at "boot time" by a central processing unit (CPU) 130 in the proxy server load balancer. This CPU 130 is interfaced to the state machines by a PCI bridge 132. The policy engine 40, for example, includes a PCI interface (I/F) 134 linking the PCI bridge to a set of policy engine control registers 136. The policy engine control registers 136 in turn are linked via a control bus 138 in policy engine 40 to various functional blocks and memory interfaces in the policy engine. Therefore the CPU 130 can configure and initialize the policy engine 40 and the memory interfaced to the policy engine by writing data to the policy engine control registers 136.

The L4 and L5-7 requests are pipelined through functional blocks in the policy engine 40, causing parallel and pipelined operations in the various memories interfaced to the policy engine. The L4 requests from the binding lookup table (BLT) 108 are received in a BLT interface 140, and the L5-7 requests from the content analysis engine (CAE) 38 are received in a CAE interface 142. The L4 and L5-7 requests pass from the BLT and CAE interfaces to a receive buffer 144, which gives priority to the L4 request in the BLT interface if both the BLT interface and the CAE interface contain requests. The receive buffer 144 also handles the scheduling for sending data to various other functional blocks such as the memory interfaces and the other blocks down the control pipeline from the receive buffer.

Requests from the receive buffer 144 pass a base-to-memory synchronization block 146, which is linked to a super group table interface 148 to initiate access of super group SDRAM 150 and is linked to a base group and SRAM table interface 152 to initiate access of server group or base group SDRAM 154 and server loading and property table SRAM 156. The base-to-memory synchronization block 146 includes a number of mailboxes and asynchronous FIFOs that send data from the base clock domain of the policy engine to memory clock domain of the memory interfaces. These mailboxes and asynchronous FIFOs are controlled by the receive buffer 144. The super group table interface 148 includes a memory controller for the super group SDRAM 150 and arbitrates between various tables that reside inside the super group SDRAM (namely, the service index table 102, the super group table 90, the proxy server port select table 104, and the server TCP control block address stack 106 as introduced in FIG. 6.) The base group and SRAM table interface 152 includes a memory controller for the base group SDRAM 154 and a memory controller for the server loading and property table SRAM 156. The base group and SRAM table interface 152 also performs any server load balancing policy applicable to each L4 or L5-7 request.

The requests are pipelined from the base-to-memory synchronization block 146 to a memory-to-base synchronization block 162, which controls assembly of information from the memories. In particular, information from the base group SDRAM 154 and the server loading and property table SRAM 156 flows to memory-to-base synchronization block 162 via the base group and SRAM table interface 152, and information from history table SDRAM 160 flows to the memory-to-base synchronization block 162 via a history table interface 158. The memory-to-base synchronization block 162 includes a number of mailboxes and asynchronous FIFOs that send data from the memory clock domain of the memory interfaces to the base clock domain of the policy engine 40. The history table interface 158 includes a memory controller for access to the history table SDRAM 160, and also arbitrates between different kinds of history table access including history seek write, history seek read, delete, and history crawling. The history table SDRAM 160 includes client IP based history entries, cookie based history entries, and session based history entries. The information assembled by the memory-to-base synchronization block 162 passes through a send buffer 164 to the data packet and connection manager 34. The send buffer 164 also controls the mailboxes and asynchronous FIFOs in the memory-to-base synchronization block 162.

Embodiments of the Invention

Figure 10:
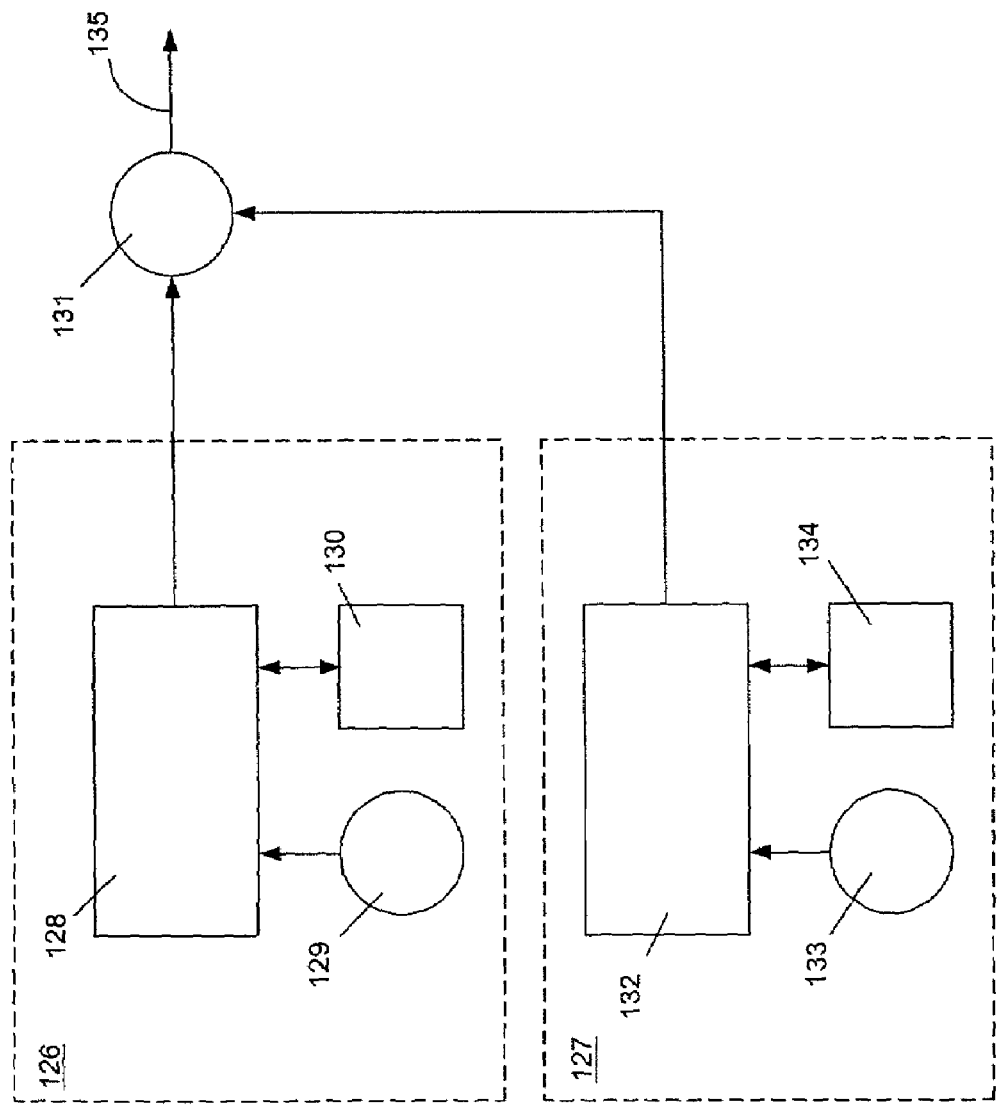
FIG. 10 is a simplified block diagram illustrating a first embodiment of a system according to the invention for applying a persistence policy to override allocation of a resource based on application of a load balancing policy.

Referring to FIG. 10, a first embodiment of the invention comprises a system for applying a persistence policy to override allocation of a resource based on application of a load balancing policy. The system comprises first logic 126 for determining if a persistence policy, identified in the figure with numeral 129, is applicable to a service request, and if so, allocating a resource to the request based on application of the persistence policy, and second logic 127 for allocating a resource to the request based on application of a load balancing policy, identified in the figure with numeral 133, if the persistence policy 129 is determined to be inapplicable as determined by the first logic 126.

For purposes of this disclosure, the term "logic" refers to hardware, software, or a combination of hardware and software; the terms "stickiness" and "persistence" are synonyms and can be used interchangeably; the phrases "service request" and "resource request" are synonyms and can be used interchangeably; and the term "memory" refers to any medium which is capable of storing data.

As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value.

In one implementation, a history table 130 is included within the first logic 126 for maintaining a list of allocations which exist or which recently expired. When a service request is received, logic 128 within first logic 126 accesses the history table 130 in accordance with the persistence policy 129 to determine if an allocation exists or recently expired for the originator of the service request. If an allocation exists or recently expired for the originator of the service request, logic 131 overrides any allocation of a resource by second logic 127 based on application of a load balancing policy, and directs, through signal line 135, allocation of the resource to the request originator which resource was identified through application of the persistence policy 129.

In this implementation, the resources are servers, and a server loading table 134 is included within the second logic 127 for maintaining loading information for one or more servers which are candidates for allocating to the service request based on application of a load balancing policy. When a service request is received, logic 132 within second logic 127 accesses the server loading table 134 and applies the load balancing policy 133 to this information to determine a server to allocate to the request based on application of the load balancing policy. If the persistence policy 129 is determined by first logic 126 to be inapplicable to the service request, logic 131 directs, through signal line 135, allocation of the server to the client which was identified by second logic 127 through application of the load balancing policy 133.

Figure 11:
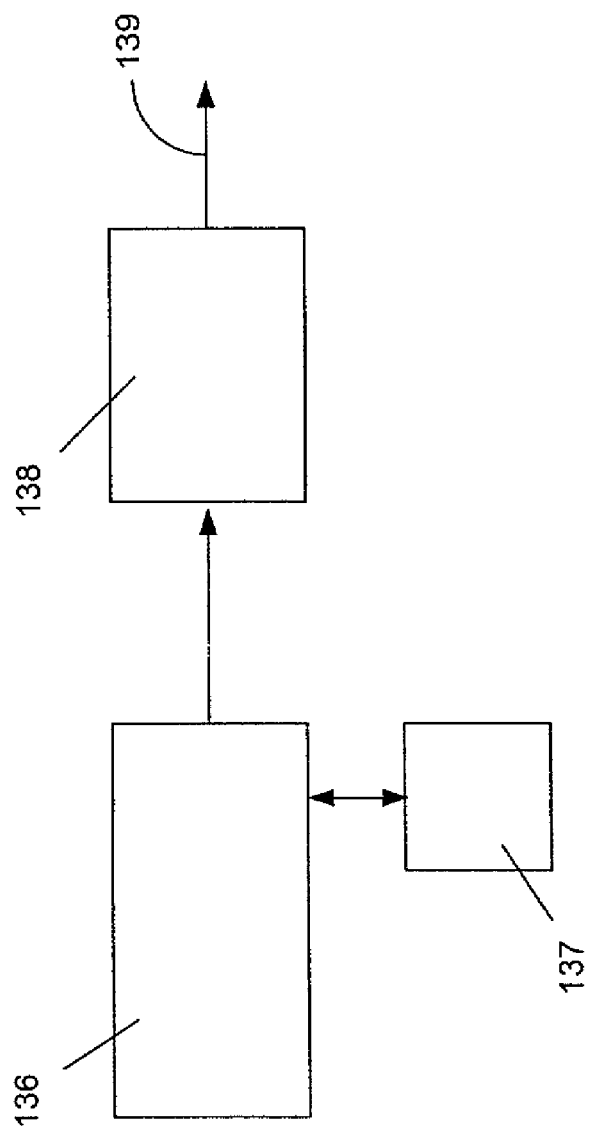
FIG. 11 is a simplified block diagram illustrating a second embodiment of a system according to the invention for allocating a resource to a resource request based on application of a persistence policy.

Referring to FIG. 11, a second embodiment of the invention comprises a system for allocating a resource to a resource request based on application of a persistence policy. The system comprises first logic 136 for determining if an allocation exists or recently expired for the originator of the resource request, and, if so, identifying the resource which was the subject of the existing or recently expired allocation, and second logic 138 for allocating the resource, if identified, to the resource request.

In one implementation, the resources are servers and allocations are represented by connections. In this implementation, a data structure 137 is maintained by the first logic 136. The data structure 137 maintains a global listing of current and recently expired connections. In this implementation, first logic 136 accesses the data structure 137 to determine if there is a current or recently expired connection for the client which issued the service request. If such a connection exists or existed, the server corresponding to the connection is identified, and second logic 138 allocates this server to the service request by directing, over signal line 139, that the server be bound to the client which issued the service request.

Figure 12:
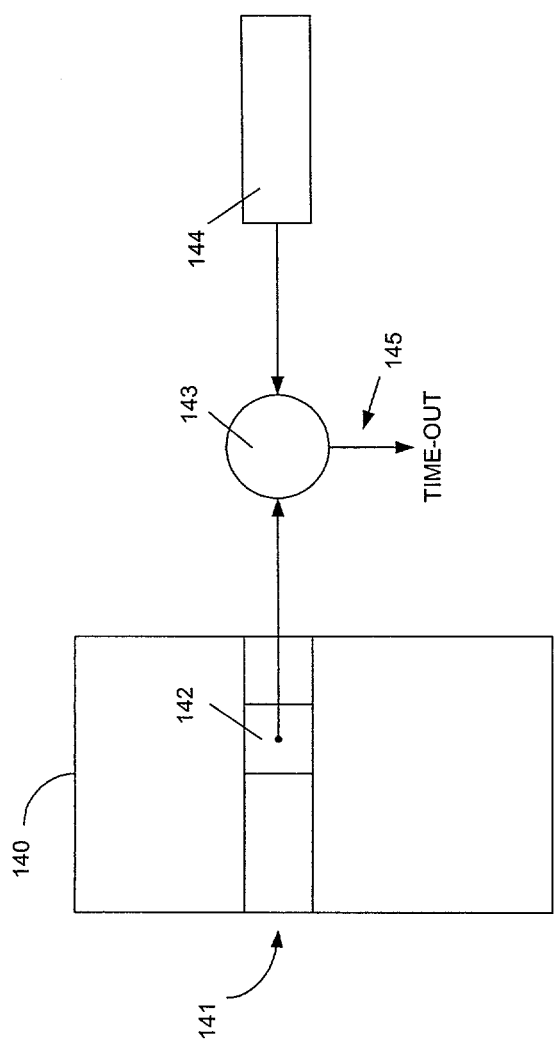
FIG. 12 is a simplified block diagram illustrating a third embodiment of a system according to the invention for maintaining a data structure useful for allocating a resource to a resource request based on application of a persistence policy, where the data structure is repetitively scanned and entries deleted which give rise to a time-out condition.

Referring to FIG. 12, a third embodiment of the invention comprises a system for maintaining a data structure 140 useful for allocating a resource to a resource request based on application of a persistence policy. The system comprises first logic (not shown) for making an entry 141 in the data structure, upon or after receipt of the resource request, representing an allocation and time-stamping the entry 141 with a time-stamp 142 indicating when or about when the allocation is terminated, and second logic 143 for scanning the data structure 140, and deleting entries for which a time out condition is determined to exist.

In one implementation, where allocations are represented by connections, the second logic 143 periodically scans entries in the data structure 140 and compares the current time, represented in FIG. 12 with numeral 144, with the time-stamp 142 contained in the entry. If the current time minus the time-stamp value equals or exceeds a programmable time-out period (which can be programmed to vary with factors such as the category of service requested by the service request which gave rise to the entry, the state of the connection corresponding to the entry, whether the connection is a layer 4 or layer 5-7 connection, etc.), a time-out condition is signaled on signal line 145. Responsive thereto, second logic 143 deletes the entry in the data structure 140.

Figure 13A:
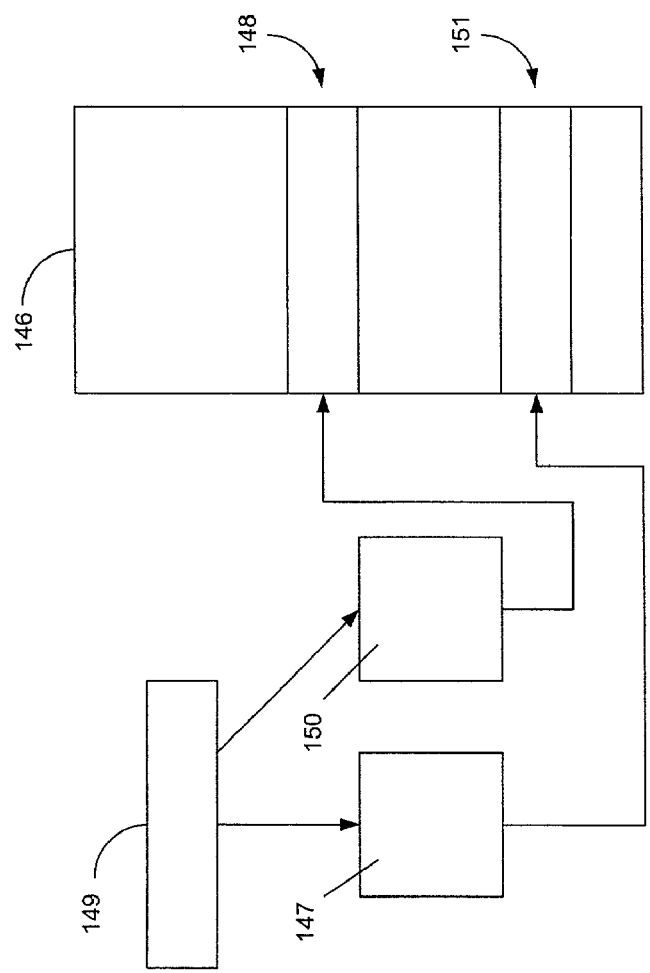
FIG. 13A is a simplified block diagram illustrating a fourth embodiment of a system according to the invention for making an entry in a data structure useful for allocating a resource to a resource request based on application of a persistence policy.

Referring to FIG. 13A, a fourth embodiment of the invention comprises a system for maintaining a data structure 146 useful for allocating a resource to a resource request based on application of a persistence policy. The system comprises first logic 147 for making an entry 148 in the data structure representing an allocation of a resource in response to a resource request, using a first index derived from information relating to the resource request 149 if such is available, and second logic 150 for making an entry 151 (which may be the same as or different from entry 148) using a second index derived from information relating to the resource request 149.

Figure 13B:
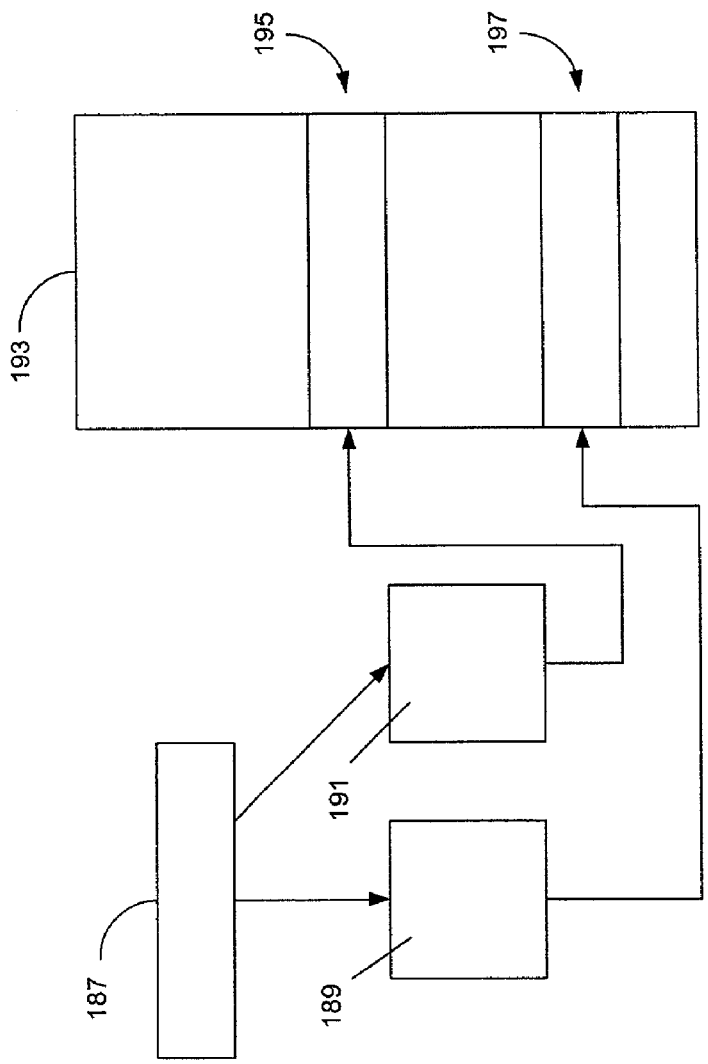
FIG. 13B is a simplified block diagram illustrating a fifth embodiment of a system according to the invention for accessing a data structure useful for allocating a resource to a resource request based on application of a persistence policy.

Referring to FIG. 13B, a fifth embodiment comprises a system for accessing a data structure 193 in order to allocate a resource to a resource request 187 based on application of a persistence policy, entries in the data structure corresponding to allocated resources. The system comprises first logic 189 for deriving a first index from information relating to a resource request 187 if such information is available, using the first index to access the data structure and determine if an entry 197 corresponding to the first index is available, and, if such an entry is available, allocating the resource corresponding to the entry 197 to the resource request 187. The system also comprises second logic 191 for deriving, if the first index or an entry corresponding to the first index is unavailable, a second index from information relating to the resource request 187, and using the second index to access the data structure and determine if an entry 195 corresponding to the second index is available, and, if such an entry is available, allocating the resource corresponding to the entry 195 to the resource request 187.

If such an entry is unavailable, in one configuration, the system then allocates a resource to the request using a suitable policy, which may be a load balancing policy or another persistence policy, and then makes one or more entries in the data structure 193 representing the new allocation.

In particular, if the first index is available, the system in this configuration uses the first index to make an entry in the data structure 193 representing the allocation. It then uses the second index to make an entry (which may be different from the previous entry) in the data structure 193 representing the allocation.

If the first index is unavailable, the system in this configuration uses the second index to make an entry in the data structure representing the allocation.

In one implementation, the resources are servers, resource requests are spawned or represented by packets, the data structure is a history table, allocations correspond to or represent connections, and entries in the history table represent connections.

In one implementation example, the first index, if available, is derived from a SSL session or cookie identifier which in turn is derived from a packet spawning the resource request. The second index is derived from the client IP address of the packet.

Upon receipt of a resource request, if session or cookie information is available in the corresponding packet, a first index is derived from this information and used to access the history table. If the access yields an entry corresponding to the first index, the corresponding server is allocated to the request.

If the access fails to yield an entry corresponding to the first index, a second index is derived from the client IP address of the corresponding packet, and used to access the history table. If this access yields an entry corresponding to the entry, the corresponding server is allocated to the request.

If this access fails to yield an entry, and no other persistence policies apply, a server is allocated to the request based on application of a load balancing policy or other persistence policy. If cookie or session information is available from the packet corresponding to the request, a first index is derived from this information, and used to make an entry in the history table to represent the newly created connection. In addition, a second index is derived from the client IP address of the packet, and used to make a second entry in the history table to represent this newly created connection.

In one configuration example, when a packet is received, the binding lookup table 108 derives a key from the packet which is used to access PE CAM 112. The resulting PE CAM entry provides information regarding the class of service desired for the packet.

Figure 27:
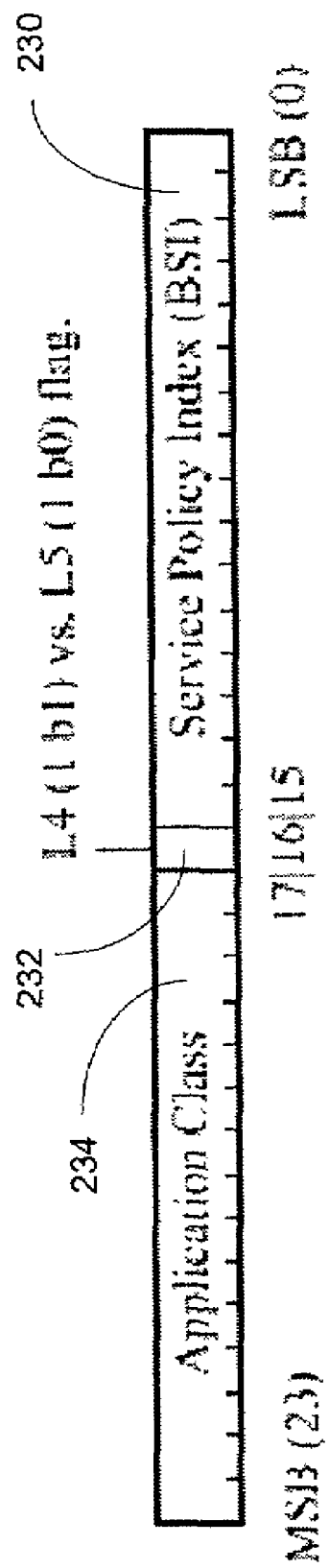
FIG. 27 illustrates an example format of a PE CAM entry derived from a packet.

An example format of the PE CAM entry is illustrated in FIG. 27. The lower 16 bits, identified with numeral 230, represents a Base Service Policy Index (BSI), and is representative of the class of service which is desired for the packet. The settings of this field are application dependent, but some examples of possible services which may be indicated by this field are whether or not the connection is to be SSL-terminated or not, whether the quality of service (QOS) is to be high or low, if the desired service is a layer 5+ service, the specific layer beyond layer 5 which is involved, the Internet service provider (ISP) to be associated with the connection, e.g., AOL, AKAMAI, YAHOO, CNN, and whether the connection or ISP is to be associated with a high or low level or priority.

Bit 16, identified with numeral 232, indicates whether the service is a layer 4 or layer 5 service.

The upper 7 bits, identified with numeral 234, indicate an application class associated with the packet. Again, the settings in this field are application dependent, but some examples of settings which are possible for this field, include whether the connection relates to .gif files, text files, etc., or whether the connection is SSL-terminated.

For a layer 4 packet, this PE CAM entry gives rise to a layer 4 service request if a connection does not already exist for the packet. This service request is promulgated by the binding lookup table 108 and forwarded to the policy engine 40. For a layer 5 packet, this PE CAM entry gives rise to a layer 5 service request which is promulgated by the content analysis engine 38 and forwarded to the policy engine 40.

An example format of the layer 4 service request is illustrated in FIG. 28. Field 236 in this example is the Base Service Policy Index, which is the same as the field 230 from the PE CAM entry illustrated in FIG. 27. Field 238 in this example is the Application Class, and is the same as the field 234 in the PE CAM entry illustrated in FIG. 27.

Figure 29:
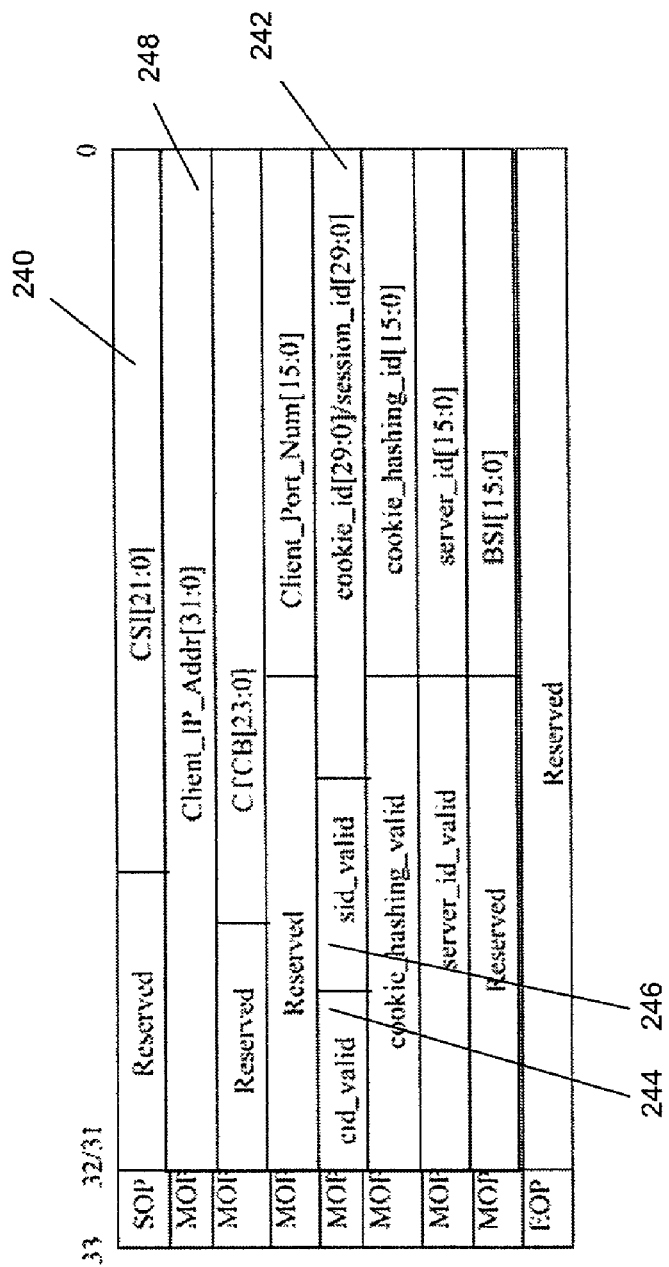
FIG. 29 illustrates an example format of a layer 5-7 resource request.

An example format of the layer 5 service request is illustrated in FIG. 29. Field 240 in this example is the Content Analyzer Service Policy Index (CSI) and is representative of the desired sub-class of service requested for the packet. Field 242 may be valid or invalid. If valid, field 242 may contain either a session identifier or cookie identifier derived from the packet. Field 244 indicates whether or not field 242 contains a cookie identifier. Field 246 indicates whether or nor field 242 contains a session identifier. Field 248 is the client IP address of the packet.

The cookie identifier, if present, is derived from a http header encapsulating the packet. A cookie identifier is derived from a cookie, which is a piece of state information which was stored by a server in an http object returned to a client. Included with the cookie is information indicating the range of URLs for which the state indicated by the cookie is valid. The client may then include the cookie in subsequent http requests for services within the prescribed range of URLs.

In one example, the content analysis engine 38 maintains a cookie name table, set at configuration time, which associates cookie names with values of the BSI. When a packet requiring service is received, the content analysis engine 38 accesses the cookie name table to determine the cookie name associated with the BSI for the packet.

The content analysis engine 38 parses the contents of the http header, looking for a match with the cookie name associated with the B SI for the packet. If a match is found, the corresponding cookie valid is extracted from the header, and the cookie identifier derived from this cookie value. For example, a hashing function may be applied to this value to obtain a cookie identifier. This cookie identifier, if found, is placed in the field 242 in the service request illustrated in FIG. 29, and field 244 is set appropriately to indicate that field 242 contains a valid cookie identifier.

The session identifier, if present, is derived from a https record layer encapsulating the packet. The session identifier is derived from a SSL session ID string assigned by the SSL server in the first session with the client. The client then sends this (unencrypted) string to the SSL server during the handshake phase of each subsequent session. In particular, this string is included in a Client Hello message sent from the client to the server. The content analysis engine 38 identifies this message, and extracts the SSL session ID string. The session identifier is then derived from the SSL session ID string. For example, a hashing function may be applied to this value to obtain the session identifier. This session identifier, if found, is placed in field 242 in the service request illustrated in FIG. 29, and field 246 is set appropriately to indicate that field 242 contains a valid session identifier. When a layer 4 service request such as that illustrated in FIG. 28 is received by the policy engine 40, no cookie or session information is available (since layer 4 service is content-disabled). Consequently, entries in and accesses to the history table relating to such requests are made in the manner described using an index derived from the client IP address of the packet which spawned the request.

When a layer 5 service request such as that illustrated in FIG. 29 is received by the policy engine 40, the fields 244 and 246 are examined to determine if a valid cookie or session identifier is present in field 242. If so, entries in and accesses to the history table relating to such requests are made in the manner described using indices derived from the cookie or session identifier (whichever is applicable) and the client IP address of the packet which spawned the request.

Figure 14A:
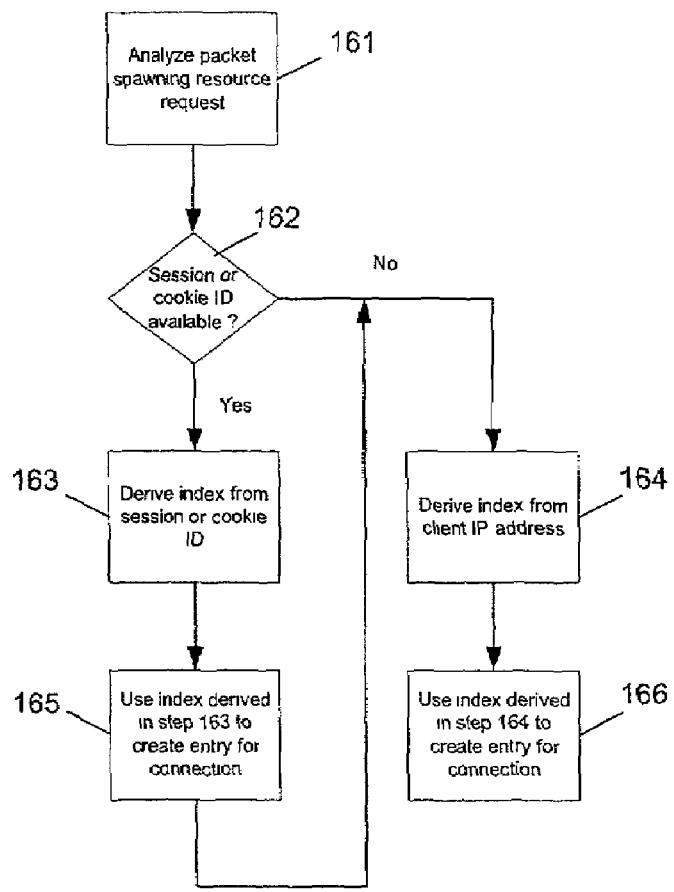
FIG. 14A is a simplified flowchart illustrating an embodiment of a method according to the invention of making an entry in a history table useful for allocating a server to a resource request based on application of a persistence policy.

Referring to FIG. 14A, a flowchart of one implementation of a method of making an entry in a history table to indicate allocation of a server to a resource request is illustrated. As illustrated, the method begins with step 161, which comprises analyzing a packet spawning the resource request to determine if a session or cookie identifier is available therefrom.

In step 162, a query is made whether a session or cookie identifier is available from the packet spawning the resource request through the analysis performed in step 161. If such an identifier is available, step 163 is performed. If such an identifier is not available, step 164 is performed.

In step 163, an index is derived from the session or cookie identifier determined in step 162 to be available from the packet spawning the resource request. In one implementation example, the index is derived through application of a hashing function to a hash key derived from the session or cookie identifier. After step 163, step 165 is performed.

In step 165, the index which has been derived in step 163 is used to create an entry in the history table for the connection which was created in response to the resource request. In one implementation example, this step comprises using the index to access a particular bucket in the history table, and then sequentially analyzing the storage locations in the bucket to find the first available storage location. The entry for the connection is then made in this storage location.

In step 164, an index is derived from the client IP address of the client which originated the packet spawning the resource request. From step 164, control passes to step 166.

In step 166, the index which has been derived in step 164 is used to create an entry in the history table for the connection which was created in response to the resource request. (This entry may differ from any entry created in step 165.) Again, in one implementation example, this step comprises using the index to access a particular bucket in the history table, and then sequentially analyzing the storage locations in the bucket to find the first available storage location. The entry for the connection is then made in this storage location.

Figure 14B:
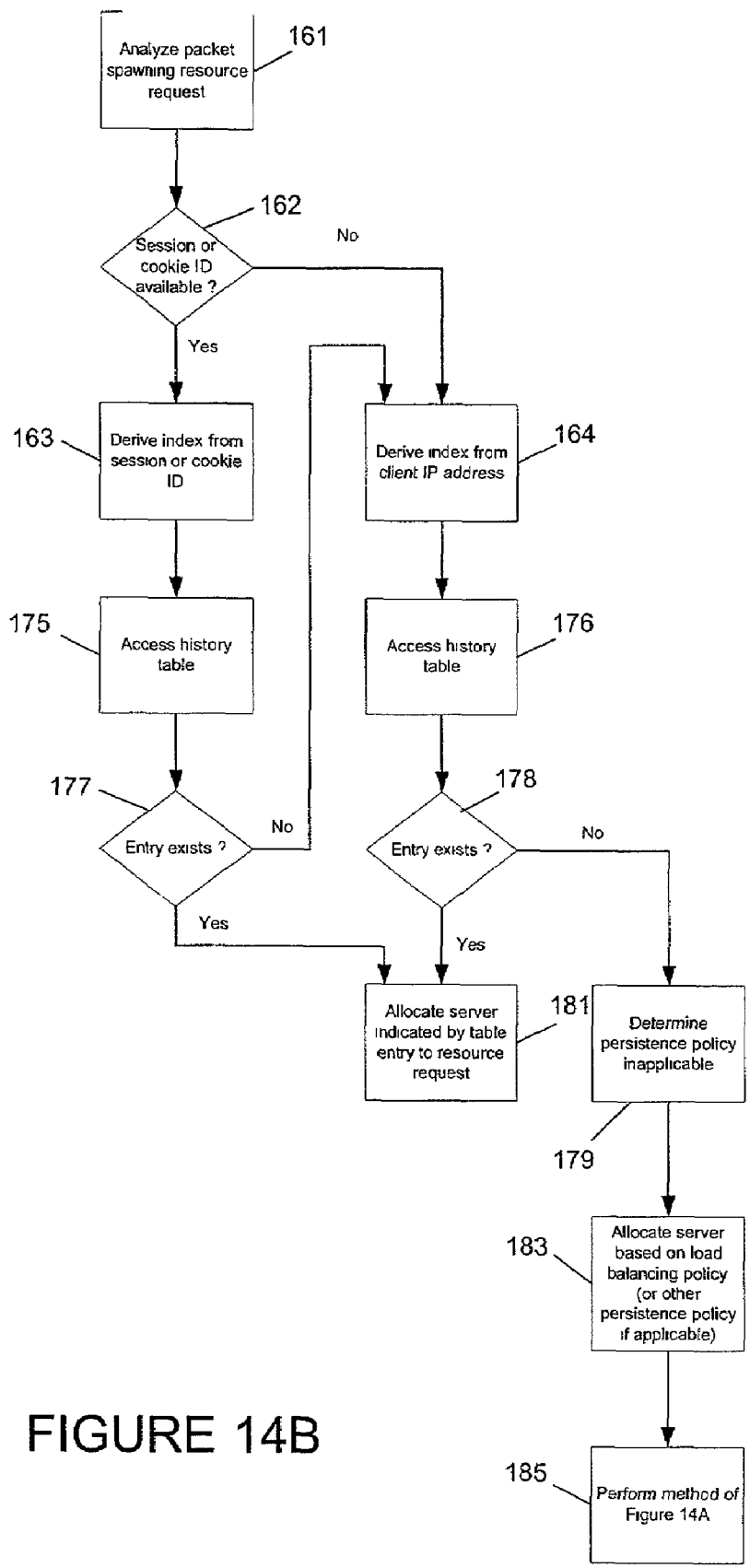
FIG. 14B is a simplified flowchart illustrating an embodiment of a method according to the invention of accessing a history table useful for allocating a server to a resource request based on application of a persistence policy.

Referring to FIG. 14B, a flowchart of one implementation of attempting access to or accessing an entry in a history table useful for allocating a server to a resource request based on application of a persistence policy is illustrated. Steps 161-164 are identical to the like-numbered steps illustrated and described in relation to FIG. 14A. Therefore, these steps need not be discussed further here, and the discussion can be focused on the remaining steps 175, 177, 179, 181, and 183.

Referring to FIG. 14B, from step 163, the method proceeds to step 175. There, an attempt is made to access an entry in the history table using the index derived in step 163. In one example, the index is used to access a particular bucket in the history table, and entries in the bucket are then sequentially accessed until and if one is determined to correspond to the index.

From step 175, the method proceeds to step 177. There, a query is made whether a corresponding entry is present in the history table. If not, a jump is made to step 164. If so, a jump is made to step 181 where the server corresponding to the entry is identified and allocated to the resource request.

From step 164, the method proceeds to step 176. There, an attempt is made to access an entry in the history table using the index derived in step 164. In one example, the index is used to access a particular bucket in the history table, and entries in the bucket are then sequentially accessed until and if one is determined to correspond to the index.

From step 176, the method proceeds to step 178. There, a query is made whether a corresponding entry is present in the history table. If not, step 179 is performed, where a determination is made that a cookie ID or session ID persistence policy is inapplicable to the resource request. If so, step 181 is performed. In step 181, the server corresponding to the entry is identified and allocated to the resource request.

From step 179, control passes to step 183. There, a server is allocated to the resource request based on application of a load balancing policy (or another persistence policy if applicable). Step 185 follows step 183. In step 185, the method of FIG. 14A is performed to create one or more entries in the history table for the newly-created connection resulting from the allocation in step 183.

Any of the foregoing systems may be implemented in hardware, software, or a combination of hardware and software. In one example, each system comprises one or more engines, each of which is implemented in hardware or a combination of hardware and software. In one configuration, each engine is implemented in the form of one or more finite state machines. Moreover, any combination of any two or more of the foregoing systems is possible, and a method counterpart to each and any of the foregoing systems is also possible.

Furthermore, any such method counterpart and any other disclosed method may tangibly embodied in the form of digital logic, such as by way of example and not limitation, finite state machines implemented as FPGA arrays, ASICS, or the like, or in the form of a series of instructions stored on a processor readable medium or memory, including without limitation, RAM, ROM, EPRPOM, PROM, EEPROM, disk, hard disk, floppy disk, CD-ROM, DVD, flash memory, etc. Moreover, any combination of any two of the foregoing methods is possible.

Implementation Example

Figure 15:
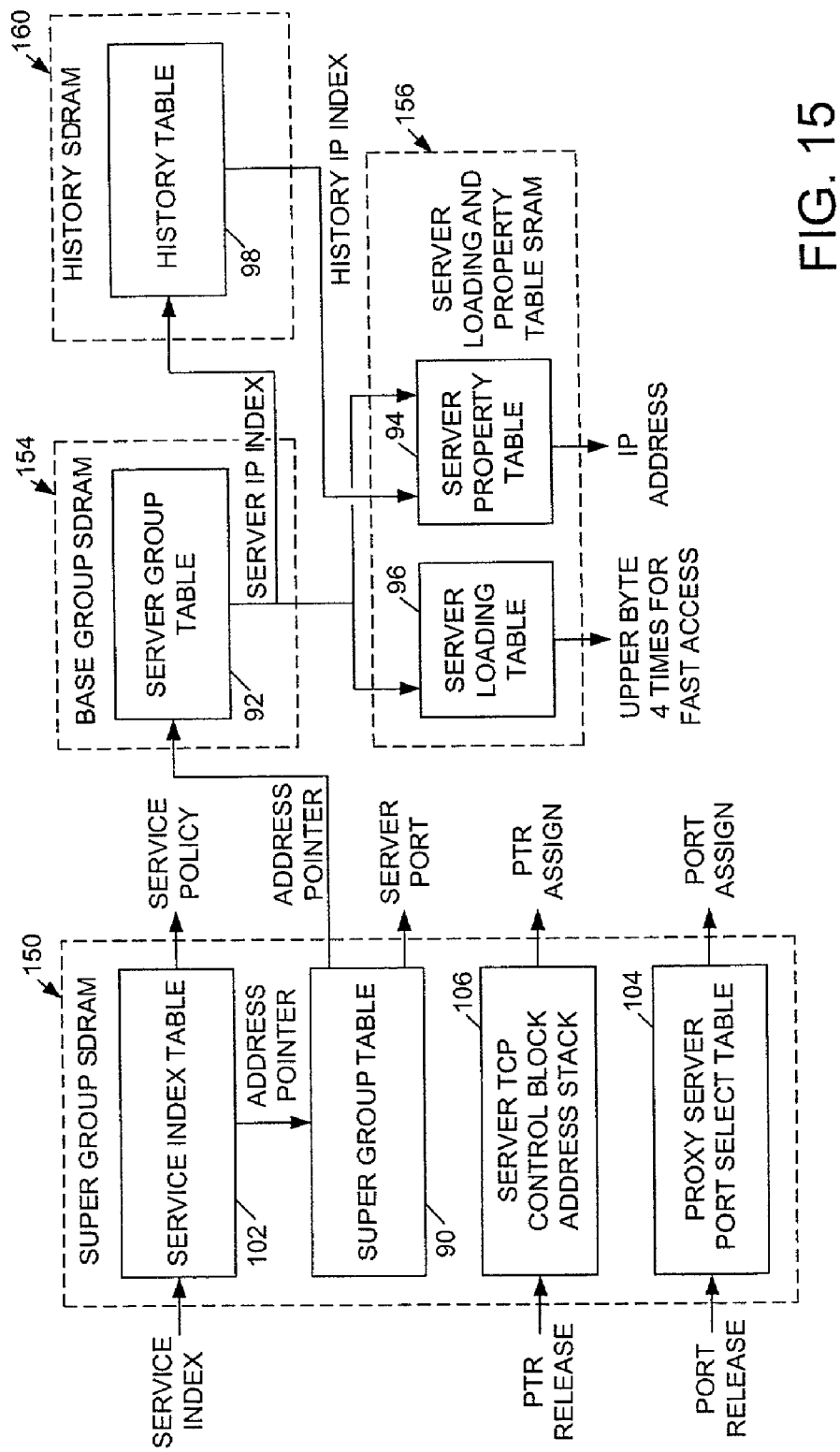
FIG. 15 is a block diagram showing various tables used by one embodiment of the policy engine.

An implementation example of the foregoing useful in the example application described in the section entitled "Example Application" will now be described. FIG. 15 shows the location and relationship in one example of the various tables in the SRAM and SDRAM introduced in FIG. 9. In one implementation, there are three SRAMs and three SDRAMs. The super group SDRAM 150 contains the service index table 102, the super group table 90, the server TCP control block address stack 106, and the proxy server port select table 104. In one implementation, the bus width for the data path is 64 bits. The base group SDRAM 154 contains the server group table 92. The bus width for the data path is also 64 bits. The server loading and property table SRAM 156 contains the server loading table 96 and the server property table 94. The history SDRAM 160 contains the history table 98. The bus width for the data path of the history SDRAM is 64 bits.

Figure 16:
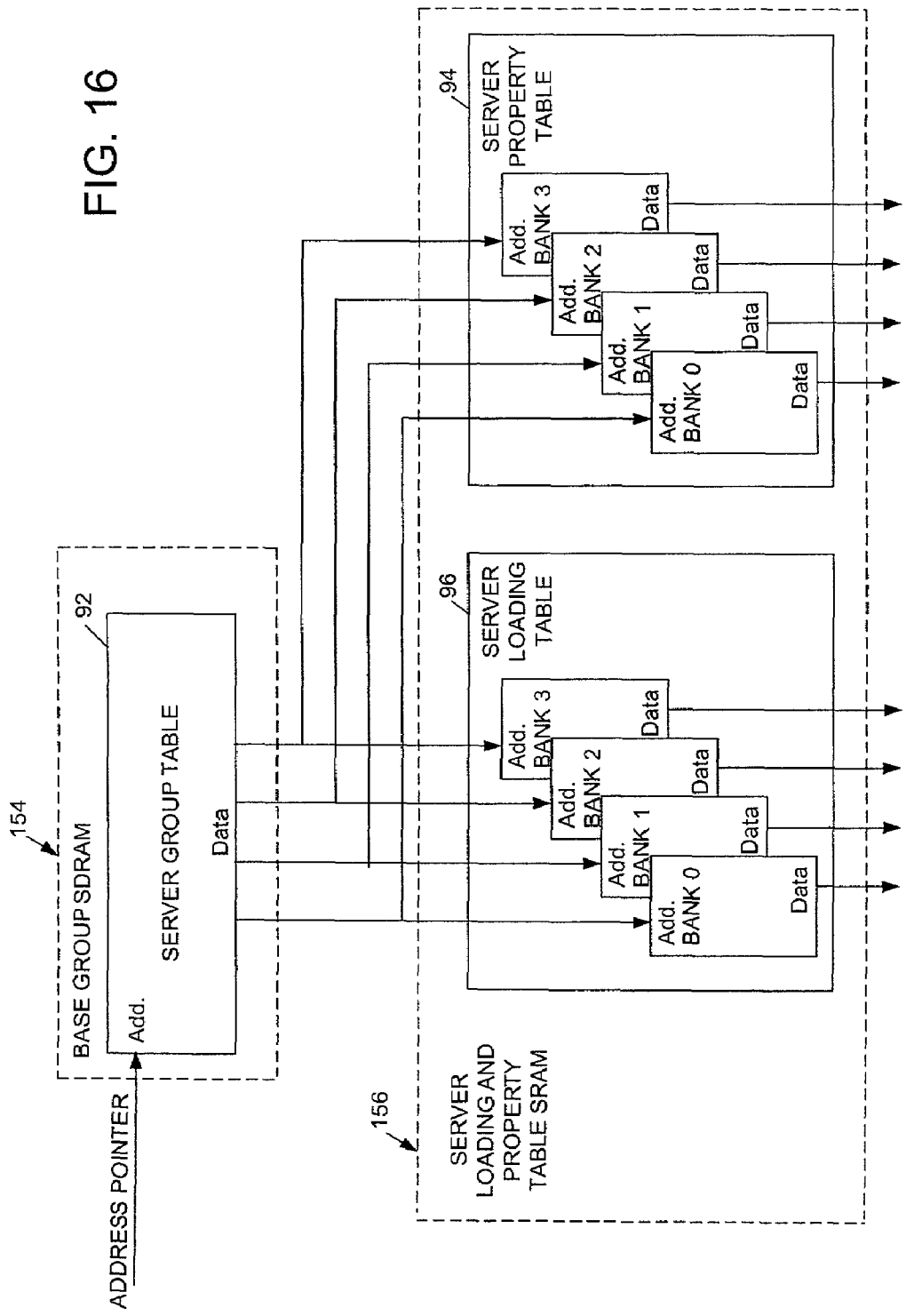
FIG. 16 shows the address/data relationship between one implementation of the server group table and the server loading and server property tables.

As shown in FIG. 16, the data bus for base group SDRAM 154 can be shared with the address bus for server loading and property table SRAM 156. In one example, server loading table 96 and server property table 94 include four banks of memory each. Each bank of memory contains the loading and property data for all servers. That is, the server loading and property information is replicated in four different places. Because the data out of base group SDRAM 154, which includes IP addresses of four servers within the selected server group output in parallel, are directly connected to the address bus of server loading and property table SRAM 156 which includes four banks each of server loading and server property data, the server loading and server property information stored within SRAM 156 is read out in parallel for four different servers at a time. By accessing this information in parallel, policy engine 40 is able to chose which server among the servers within the server group to allocate in far fewer clock cycles than if the information were stored and retrieved serially. More generally, each of the server loading table 96 and server property table 94 contain n banks of memory, each bank containing all of the loading and property information for all of the servers, such that the loading and property information for n servers residing within a single server group can be read out in parallel. Particular server groups may contain more than n servers, in which case multiple accesses to the server group table, server loading table, and server property table must be made in order to read out the loading and characteristics of all of the servers within the server group so that a choice can be made among all of the candidate servers.

Figure 17:
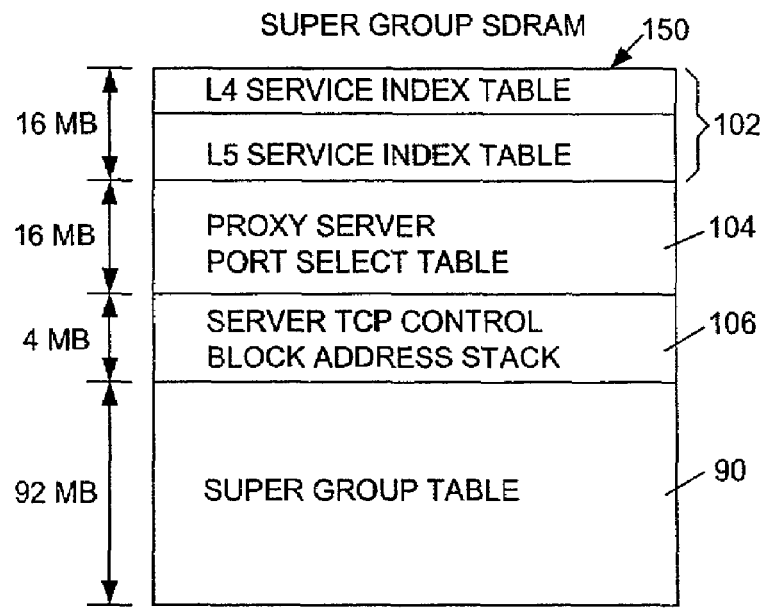
FIG. 17 is a memory map of one implementation of a super group memory.

FIG. 17 shows an example of a memory map for the super group SDRAM 150. In this example, each of the tables in the super group SDRAM 150 is aligned with the 64-bit boundary of the data path. Sixteen megabytes is allocated to the service index table 102, which is divided into a first portion indexed by L4 service indices and a second portion indexed by L5-7 service indices. Sixteen megabytes is allocated to the proxy server port select table 104, 4 megabytes is allocated to the server TCP control block address stack 106, and 92 megabytes is allocated to the super group table 90.

FIG. 18 shows one example of an entry 170 of the service index table (102 in FIG. 17). The entry 170 contains a 24-bit super group address, and an 8-bit policy code or indicator. The policy code specifies which of various pre-defined scheduling policies to apply when choosing which server from among the candidate servers within a particular server group that will be pointed to, to bind a request to. For recording statistics of the number of outstanding services, the entry also includes a total service count, a current service count, and a peak service count.

FIG. 19 shows one example of an entry 180 of the super group table (90 in FIG. 17). The entry 180 includes information for a particular super group. The entry 180 includes a total number of server base groups in the super group (denoted as MEMBER NO.), a current group index or round robin counter (CURRENT NO.) used by the round-robin load balancing policy, a server port number associated with the super group, and the physical address for each of the server base groups in the super group beginning with a first address (BASE GROUP ADDR0), and also a second address (BASE GROUP ADDR1) if there are more than one server base group in the super group. The unused fields bits in the entry 180 are indicated as reserved (RESERVED or RES'D). If there are more than two server base groups in the super group, then the entry 180 would include additional 64-bit words to hold the additional addresses of the additional server base groups in the super group. The round robin counter is read out, incremented or equivalently decremented, and rewritten such that requests are distributed evenly among server groups within each super group. Other allocations besides round robin for allocating server groups are possible.

FIG. 20 shows an example of an entry 190 in the proxy server port select table (104 in FIG. 17). The entry 190 contains a proxy server port no. and an associated proxy server IP address.

FIG. 21 shows an example of an entry 200 of the server TCP control block address stack (150 in FIG. 17). The entry 200 includes a first generation count and associated first server TCP control block address in the lower 32 bits of the 64-bit word, and a second generation count and associated second server TCP control block address in the upper 32 bits of the 64-bit word.

FIG. 22 shows that, in one example, the base group SDRAM 154 contains the server group table 92, which, in this particular example, has a size of 256 megabytes.

FIG. 23 shows one example of an entry 210 of the server group table (92 in FIG. 22). The entry 210 includes two sixty-four-bit words. The first word contains the total number of servers (MEMBER NO.) in the server base group (containing from 1 to 128 servers), a current server index (CURRENT NO.) used by the round-robin policy, an indication of a last resort server, and a flag. The second word contains up to four sixteen-bit server IP indices. If there are more than four servers in a server base group, then the corresponding entry of the server group table includes at least one additional sixty-four-bit word to contain additional server IP indices, or a flag to indicate that the server group is continued into the next table entry.

Figure 24A:
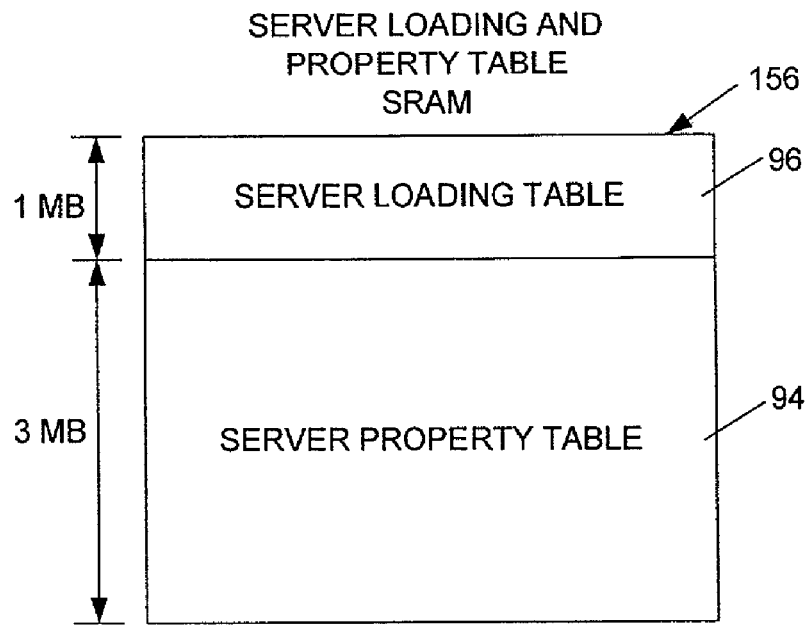
FIG. 24A shows one example of a logical organization of the server loading and property tables.
Figure 24B:
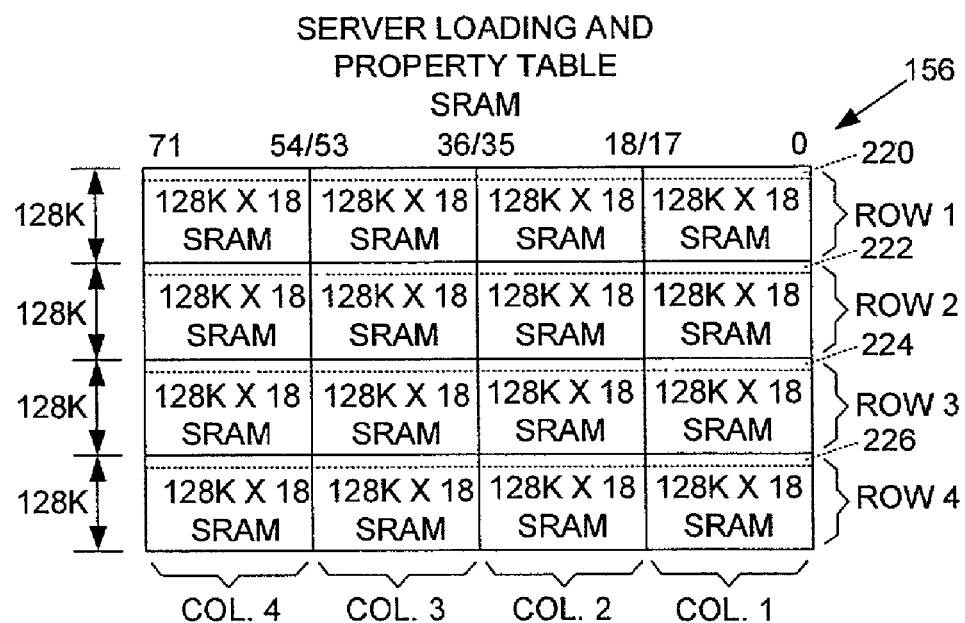
FIG. 24B shows one example of a physical organization of the server loading and property tables.

FIG. 24A shows one example of a logical organization of the server loading and property table SRAM 156. FIG. 24B shows one example of the physical organization of the same SRAM.

FIG. 25 shows one example of the arrangement of the history table, and FIG. 26 shows one example of an entry within the history table. In this example, the table comprises a plurality of buckets, each bucket comprising one or more table entries. In this example, there are three possible hashing keys which may be used to store or access entries in the table: client IP address, cookie ID, and session ID. If a cookie ID or a session ID is available in relation to a resource request, then either of those is used as the key. Only if a cookie ID or a session ID is not available, is client IP address used as the key. In this particular example, keys based on cookie IDs or session IDs take precedence over those based on client IP addresses since client IP addresses may change within a particular session, and thus are not considered as reliable. Once a key is determined, a hashing function is applied to the key to produce a history table index. The history table index maps into a particular bucket of the history table. Thus, the same hashing function is applied to all three keys.

An entry is stored in the table by first determining a key for the entry, translating the key into an index using the hashing function, translating the index into a bucket, and then finding the first available storage location in the bucket. If a collision is detected, a sequential search is performed to find the next available storage location in the bucket. The entry is then stored in this location.

An entry in the table is accessed by first determining a key for the entry, translating the key into an index using the hashing function, translating the entry into a bucket, and then sequentially examining the entries in the bucket until the desired entry is located.

Referring to FIG. 26, each entry in this particular example of the history table includes a service index, identified with numeral 110, a time stamp, identified with numeral 112, and the key associated with the entry, identified with numeral 114. The service index 110 may originate from binding lookup table 108 (BLT service index, or BSI) in the case of a layer 4 connection, or from the content analysis engine 38 (CAE service index, or CSI) in the case of a layer 5-7 connection. The time stamp 112 indicates the time the entry was entered into the table. The key field 114 has already been discussed.

An entry in the table is made when a connection is established. A key associated with the connection is determined. As discussed, if session ID or cookie ID is available in relation to the connection, one of these two values is used as the key. Otherwise, the client IP associated with the connection is used as the key.

Once determined, the key is translated by the hashing function into a bucket, and the next available storage location in the bucket determined through a sequential search. An entry in then made in this storage location corresponding to the connection which has been established. In particular, the service index which gave rise to the connection is stored in field 110. A time stamp indicating the time the connection was established is stored in field 112. The key is stored in field 114. The ID of the server which is bound to the connection is stored in field 116.

An entry in the history table may be deleted through one of several mechanisms. First, an entry may be marked for deletion once the connection corresponding to the entry is terminated or disconnected. A crawler running in the background then deletes the entry after a predetermined amount of time has passed. (The crawler compared the time stamps associated with entries marked for deletion with the current time, and deletes the entry after the prescribed time has passed.) The entry is not immediately deleted upon termination of the connection in order to support certain types of stickiness policies (to be discussed).

Second, an entry may be deleted when the bucket containing the entry is full, and space must be freed up for storage of new entries in the bucket. In one example, a bucket contains a maximum of 8 entries, and when additional space is needed in a bucket which is full, the oldest entry in the bucket is simply deleted and replaced with an entry for a new connection.

Third, an entry may be deleted simply through operation of the crawler even if the entry is not marked for deletion. In other words, the crawler runs in the background, comparing the time stamps of entries with the current time, and deletes entries if a prescribed time period has passed even if the entries are not marked for deletion. These entries are deleted because they are sufficiently old to be considered a vestige of a connection which failed to terminate properly, possibly because the client or server associated with the connection hung up.

The entries in the history table may be used to support two types of stickiness policies. The first type seeks to allocate a server for a connection which already exists to a request from the same client for the same class of service. The second type seeks to allocate a server for a recently terminated connection to a request from the same client for the same class of service. The reason that entries are maintained in the history table for a predetermined time period after the connection has expired is to support this second type of stickiness policy.

Note that a client-initiated session may generate more than one entry in the history table. When the session first commences, an initial request for service may be received that has no session ID or cookie ID associated with it. After a binding has been made by the policy engine, that binding will be stored in history table 98 using the client IP address as the key. When another request for service is received by the same client, a session ID or cookie ID may be associated with the request. The policy engine will first examine history table 98 for entries corresponding to the received session ID or cookie ID. Failing to find a valid entry, the policy engine will next examine history table 98 for an entry corresponding to received client IP address. The policy engine will find a valid entry including a server ID, and will allocate that server to the request. The policy engine will also hash the session ID and/or the cookie ID into a hash table entry, and make an additional entry in history table 98 corresponding to the session ID or cookie ID. The history now contains multiple entries for the same client-server connection. If a third request for service is initiated by the same client, and the session ID or cookie ID is included with the request, the policy engine will search for entries corresponding to the received session or cookie ID, and locate the entry in the table which has already been established for this key. It will then determine the server associated with this entry, and allocate it to the request.

Note that hashing keys are possible which are based on truncated, compacted, or otherwise reduced, values of the session IDs, cookie IDs, or client IP addresses, as appropriate. Moreover, hashing keys are possible which are based on parameters or values associated with a connection other than session IDs, cookie IDs, or client IP addresses.

In one example, the hashing is performed using a standard 32-bit cyclic redundancy check (CRC-32) hashing algorithm, and the resulting 32-bit number is truncated to create the 21-bit history table index. The 32-bit hashing and truncation to 21 bits allows for scalability, providing for easy expansion of up to 32 bits of history table indexing. Other hashing algorithms and methods are possible, depending on the maximum expected number of servers, maximum number of connections, the maximum number of learned connections to be valid, the desirability of avoiding collisions, and other parameters.

In one example, history table 98 contains $2^{21}$ buckets, with each bucket comprising 8 entries, and with each entry in a bucket comprising the key for the entry (cookie ID number, session ID number, or Client IP address) and a timestamp field indicating when the connection was established. Moreover, in this example, a sequence search is undertaken to locate the next available location in a bucket, or to locate a particular entry in a bucket. However, it should be appreciated that other configurations are possible, depending on the circumstances.

Note also that the maximum allowable age of a connection can be set to different times depending on whether the connection was associated with an L4 or an L5-7 request, the type of services that was requested, and other criteria. In this way the policy engine provides for efficient searching and aging or timing out of entries in the history table.

While various embodiments of the invention have been described, it will be apparent to those of ordinary skill in the art that many more embodiments and implementations are possible that are within the scope of this invention. For example, the number of bits of information for any given data or address field can be changed, the width of busses could be changed, and the number of storage locations could be changed, all to suit the needs of a given application without departing from the scope of the invention. It will also be recognized that the present invention can be easily adapted to various types of communication networks using various communication protocols, or other applications besides servicing requests in a TCP/IP network.

What is claimed is:

1. A system for allocating a resource in a network comprising: multiple network data ports to connect to the network to receive and route requests to servers in the network; first logic coupled to the network data ports for determining if any of a plurality of persistence policies, comprising at least one first persistence policy and at least one second persistence policy, is applicable to a service request from a client in the network, and, if so, allocating the resource to the request based on application of the persistence policy determined to be applicable, wherein the first persistence policy, if applicable, directs the service request to a server, previously or currently connected to the client, that is identified based on content of the service request, the content comprising server, session or cookie information within the service request or corresponding packet at one or more layers corresponding to OSI layers 5-7, and wherein the second persistence policy, if applicable, directs the service request to a server, previously or currently connected to the client, that is identified based on client information within the service request or corresponding packet; the first logic configured so that: when a service request for a content-enabled service, comprising a request for a connection to a server at a layer corresponding to any of OSI layers 5-7, is received, the first logic determines if the at least one first persistence policy is applicable; when a service request for a non-content-enabled service, comprising a request for a connection to a server at a layer corresponding to OSI layer 4, is received, the first logic determines if the at least one second persistence policy is applicable; when the service request for a content-enabled service is received but it is determined that the at least one first persistence policy is inapplicable, the first logic determines if the at least one second persistence policy is applicable; wherein the first logic is shared by and supports service requests for both content-enabled and non-content enabled services; and second logic coupled to the network data ports for allocating the resource to the request based on application of a load balancing policy only if none of the plurality of persistence policies is determined to be applicable as determined by the first logic; wherein, when the service request for a content-enabled service is bound to a server identified through application of a load balancing policy, such request is bound to the server only after multiple persistence policies are checked for applicability; and one or more of the foregoing elements are implemented, embodied, maintained or controlled by one or more processor devices.

2. The system of claim 1 wherein the first logic determines if a persistence policy is applicable to a service request through consideration of whether or not an allocation exists or recently expired for an originator the service request.

3. The system of claim 1 wherein the at least one first persistence policy comprises one or more of a cookie hashing stickiness persistence policy, a session-ID hashing stickiness persistence policy, and a self-identification stickiness persistence policy, and the at least one second persistence policy comprises at least one client-based persistence policy.

4. The system of claim 1 wherein the at least one first persistence policy comprises at least one session-based persistence policy, and the at least one second persistence policy comprises at least one client-based persistence policy.

5. The system of claim 1 where the at least one first persistence policy is content-aware, and the at least one second persistence policy is non-content aware.

6. A system for allocating a resource, in a network, to a resource request, the request having an originator, based on application of a persistence policy comprising: multiple network data ports to connect to the network to receive and route requests to servers in the network; first logic coupled to the data ports for determining whether an allocation exists or recently expired for the originator of the resource request, based on application of any of a plurality of persistence policies, comprising at least one first persistence policy and at least one second persistence policy, to the request, and, if so, identifying the resource which is the subject of the existing or recently expired allocation, wherein the first persistence policy, if applicable, directs the resource request to a server, currently or previously connected to the originator of the request or corresponding client, that is identified based on content of the resource request, the content comprising server, session or cookie information within the resource request or corresponding packet at one or more layers corresponding to OSI layers 5-7, and wherein the second persistence policy, if applicable, directs the resource request to a server, currently or previously connected to the originator of the request or corresponding client, that is identified based on client information within the request or corresponding packet; the first logic configured so that: when a resource request for a content-enabled service, comprising a request for a connection to a server at a lager corresponding to any of OSI layers 5-7, is received, the first logic determines whether an allocation exists or recently expired for the originator of the resource request by applying the at least one first persistence policy, or the at least one second persistence policy when the at least one first persistence policy is determined to be inapplicable; when a resource request for a non-content-enabled service, comprising a request for a connection to a server at a layer corresponding to OSI layer 4, is received, the first logic determines whether an allocation exists or recently expired for the originator of the resource request by applying the at least one second persistence policy; wherein the first logic is shared by and supports resource requests for both content enabled and non-content enabled services; and second logic in the network for allocating the resource, once identified, to the resource request; wherein, when the service request for a content-enabled service is bound to a server identified through application of a load balancing policy, such request is bound to the server only after multiple persistence policies are checked for applicability; and one or more of the foregoing elements are implemented, embodied, maintained or controlled by one or more processor devices.

7. The system of claim 6 wherein the resource request is derived from or represented by a packet.

8. A method of allocating a resource in a network comprising: providing multiple data ports to connect to the network to receive and route requests to servers in the network; determining if any of a plurality of persistence policies, comprising at least one first persistence policy and at least one second persistence policy, is applicable to a service request from a client in the network, and, if so, allocating the resource to the request based on application of the persistence policy determined to be applicable, wherein the first persistence policy, if applicable, directs the service request to a server, currently or previously connected to the client, that is identified based on content of the service request, the content comprising server, session or cookie information within the service request or corresponding packet at one or more layers corresponding to OSI layers 5-7, and wherein the second persistence policy, if applicable, directs the service request to a server, currently or previously connected to the client, that is identified based on client information within the service request or corresponding packet; when a service request for a content-enabled service, comprising a request for a connection to a server at a layer corresponding to any of OSI layers 5-7, is received, the determining step comprises determining if the at least one first persistence policy is applicable; when a service request for a non-content-enabled service, comprising a request for a connection to a server at a layer corresponding to OSI layer 4, is received, the determining step comprises determining if the at least one second persistence policy is applicable; when the service request for a content-enabled service is received, but it is determined that the at least one first persistence policy is inapplicable, the determining step comprises determining if the at least one second persistence policy is applicable; performing the foregoing steps through logic coupled to the data ports that is shared by and supports service requests for both content enabled and non-content enabled services; and allocating the resource to the request based on application of a load balancing policy only if none of the persistence policies in the plurality of persistence policies is determined to be applicable in the foregoing determining step; wherein, when the service request for a content-enabled service is bound to a server identified through application of a load balancing policy, such request is bound to the server only after multiple persistence policies are checked for applicability; and one or more of the foregoing steps are performed in, by or for one or more processor devices.

9. A method of allocating a resource, in a network, to a resource request based on application of a persistence policy, the request having an originator, comprising: providing multiple network data ports to connect to the network to receive and route requests to servers in the network; determining whether an allocation exists or recently expired for the originator of the resource request, based on application of any of a plurality of persistence policies, comprising at least one first persistence policy and at least one second persistence policy, to the request, and, if so, identifying the resource which is the subject of the existing or recently expired allocation, wherein the first persistence policy, if applicable, directs the resource request to a server, currently or previously connected to the originator of the resource request or corresponding client, that is identified based on content of the resource request, the content comprising server, session or cookie information within the resource request or corresponding packet at one or more layers corresponding to OSI layers 5-7, and wherein the second persistence policy, if applicable, directs the resource request to a server, currently or previously connected to the originator of the request or corresponding client, that is identified based on information within the resource request or corresponding packet other than content; when a resource request for a content-enabled service, comprising a request for a connection to a server at a layer corresponding to any of OSI layers 5-7, is received, the determining step comprises determining whether an allocation exists or recently expired for the originator of the resource request by applying the at least one first persistence policy, or the least one second persistence policy when the at least one first persistence policy is determined to be inapplicable; when a resource request for a non-content-enabled service, comprising a request for a connection to a server at a layer corresponding to OSI layer 4, is received, the determining step comprises determining whether an allocation exists or recently expired for the originator of the request by applying the at least one second persistence policy; performing the foregoing steps through logic coupled to the data ports that is shared by and supports both resource requests for content enabled and non-content enabled services; and allocating the resource in the network, once identified, to the resource request; wherein, when the service request for a content-enabled service is bound to a server identified through application of a load balancing policy, such request is bound to the server only after multiple persistence policies are checked for applicability; one or more of the foregoing steps are performed in, by or for one or more processor devices.

10. The method of claim 9 wherein the resource request is spawned by a packet.

11. THE method of any one of claims 8 and 9 wherein the one or more processor devices comprise one or more hardware processor devices, one or more processors executing software, or any combination of the foregoing.

12. The method of claim 11 wherein the one or more hardware processor devices comprise one or more finite state machines.

13. The method of claim 12 wherein the one or more finite state machines are implemented as one or more application specific integrated circuits (ASICs).

14. A system for allocating a resource in a network comprising: multiple network data ports to connect to the network to receive and route requests to servers in the network; first logic coupled to the network data ports for determining if any of a plurality of persistence policies, comprising at least one cookie-based persistence policy, at least one session-based persistence policy, and at least one client-based persistence policy, is applicable to a service request from a client in the network, and, if so, allocating the resource to the request based on application of the persistence policy determined to be applicable, wherein the first persistence policy, if applicable, directs the service request to a server, currently or previously connected to the client, that is identified based on content of the service request, the content comprising server, session or cookie information within the service request or corresponding packet at one or more layers corresponding to OSI layers 5-7, and wherein the second persistence policy, if applicable, directs the service request to a server, currently or previously connected to the client, that is identified based on client information within the service request or corresponding packet at a layer corresponding to OSI layer 4; the first logic configured so that: when a service request for a content-enabled service, comprising a request for a connection to a server at a layer corresponding to any of OSI layers 5-7, is received, the first logic determines if either the at least one cookie-based or at least one session-based persistence policy is applicable; when a service request for a non-content-enabled service, comprising a request for a connection to a server at a layer corresponding to OSI layer 4, is received, the first logic determines if the at least one client-based persistence policy is applicable; when the service request for a content-enabled service is received but it is determined that both the at least one client-based persistence policy and the at least one session-based persistence policy are inapplicable, the first logic determines if the at least one client-based persistence policy is applicable; wherein the first logic is shared by and supports service requests for both content-enabled and non-content enabled services; and second logic in the network for allocating the resource to the request based on application of a load balancing policy only if none of the plurality of persistence policies is determined to be applicable as determined by the first logic wherein, when the service request for a content-enabled service is bound to a server identified through application of a load balancing policy, such request is bound to the server only after multiple persistence policies are checked for applicability; and one or more of the foregoing elements are implemented, embodied, maintained or controlled by one or more processor devices.

15. The system of any one of claims 1, 6, and 14 wherein the one or more processor devices comprise one or more hardware processor devices, one or more processors executing software, or any combination of the foregoing.

16. The system of claim 15 wherein the one or more hardware processor devices comprise one or more finite state machines.

17. The system of claim 16 wherein the one or more finite state machines are implemented as one or more application specific integrated circuits (ASICs).

* * * * *

UNITED STATES PATENT AND TRADEMARK OFFICE
CERTIFICATE OF CORRECTION

PATENT NO.      : 7,584,262 B1  Page 1 of 1
APPLICATION NO. : 10/075051
DATED           : September 1, 2009
INVENTOR(S)     : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this

Fourteenth Day of September, 2010

David J. Kappos
*Director of the United States Patent and Trademark Office*